(12) United States Patent
Camnisch et al.

(10) Patent No.: US 7,360,080 B2
(45) Date of Patent: Apr. 15, 2008

(54) NON-TRANSFERABLE ANONYMOUS CREDENTIAL SYSTEM WITH OPTIONAL ANONYMITY REVOCATION

(75) Inventors: Jan Leonhard Camnisch, Rueschlikon (CH); Anna Lysyanskaya, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 1468 days.

(21) Appl. No.: 10/000,918

(22) Filed: Nov. 2, 2001

(65) Prior Publication Data

US 2002/0103999 A1  Aug. 1, 2002

(30) Foreign Application Priority Data

Nov. 3, 2000  (EP)  ................. 00123976

(51) Int. Cl.
*H04L 9/00* (2006.01)
(52) U.S. Cl. ........................... 713/156; 705/74
(58) Field of Classification Search ........ 713/156–158, 713/182, 175; 705/74–76, 64–68; 726/5, 726/9
See application file for complete search history.

(56) References Cited

U.S. PATENT DOCUMENTS

| | | | | |
|---|---|---|---|---|
| 4,529,870 A | * | 7/1985 | Chaum | 235/380 |
| 5,604,805 A | * | 2/1997 | Brands | 380/30 |
| 5,712,913 A | * | 1/1998 | Chaum | 705/74 |
| 5,754,938 A | * | 5/1998 | Herz et al. | 725/116 |
| 5,901,229 A | * | 5/1999 | Fujisaki et al. | 380/30 |
| 6,076,078 A | * | 6/2000 | Camp et al. | 705/65 |
| 6,385,725 B1 | * | 5/2002 | Baum-Waidner | 713/175 |
| 6,446,052 B1 | * | 9/2002 | Juels | 705/69 |
| 6,959,388 B1 | * | 10/2005 | Bleumer | 713/180 |
| 7,020,638 B1 | * | 3/2006 | Yacobi et al. | 705/69 |
| 2003/0158960 A1 | * | 8/2003 | Engberg | 709/237 |

OTHER PUBLICATIONS

David Chaum, Security Without Identification: Transaction systems to make Big Brother Obsolete, Communications of ACM, vol. 28, No. 10, Oct. 1985.*
Markus Stadler, Publicly Verifiable Secret Sharing, Advances In Cryptography-EUROCRYPT '96, LNCS 1070, pp. 190-199, 1996.*

* cited by examiner

*Primary Examiner*—Kim Vu
*Assistant Examiner*—Nirav Patel
(74) *Attorney, Agent, or Firm*—Keusey, Tutunjian & Bitetto, P.C.; Eustus D. Nelson, Esq.

(57) ABSTRACT

The present invention relates to a method and system for securely proving ownership of pseudonymous or anonymous electronic credentials. A credential system is described consisting of users and organizations. An organization knows a user only by a pseudonym. The pseudonyms of the same user, established for use with different organizations, cannot be linked. An organization can issue a credential to a pseudonym, and the corresponding user can prove possession of this credential to another organization that knows him under another pseudonym. During the prove of possession of the credential nothing besides the fact that he owns such a credential is revealed. A refinement of the credential system provides credentials for unlimited use, so called multiple-show credentials, and credentials for one-time use, so called one-show credentials.

19 Claims, 1 Drawing Sheet

NON-TRANSFERABLE ANONYMOUS CREDENTIAL SYSTEM WITH OPTIONAL ANONYMITY REVOCATION

BACKGROUND OF THE INVENTION

1. Field of the Invention

The present invention relates to the field of computer network management, it specifically concerns a method and a technical implementation for secure data exchange over a computer network. More particularly, the present invention relates to a method and system for securely proving ownership of pseudonymous or anonymous electronic credentials.

2. Description of the Related Art

Since the mid 1990s one of the most rapidly growing retail sectors is referred to as electronic commerce. Electronic commerce involves the use of the Internet and proprietary networks to facilitate business-to-business, consumer, and auction sales of everything imaginable, from computers and electronics to books, recordings, automobiles, and real estate. In such an environment consumer privacy is becoming a major concern.

However, the mere fact that electronic commerce is conducted over an existing open network infrastructure such as the Internet runs counter to the privacy of the consumer. Often, there are legitimate reasons for a party to remain anonymous.

OBJECT OF THE INVENTION

Starting from this, the object of the present invention is to provide a method and a system for securely proving ownership of pseudonymous or anonymous electronic credentials, wherein a party that proves its ownership of the credential can stay anonymous, i.e., that does not need to reveal its identity.

BRIEF SUMMARY OF THE INVENTION

The foregoing object is achieved by a method and a system as laid out in the independent claims. Further advantageous embodiments of the present invention are described in the sub claims and are taught in the following description.

In the independent claims the same invention, and more particularly, the same system is described having closely related methods. First a user has to join the whole system. Then, the user is able to establish more connections to different organizations, which are also belonging to the system. Finally, the user is able to show respective credentials, which the user gathered before to a verifier (or further organizations). Hence, all such methods realising a single system which is based on the present invention.

As the collection and exploitation of secret information become more of a concern, users are less willing to give out information, and may want to conduct transactions under a pseudonym or anonymously. For example, a user in a pseudonymous or anonymous transaction may receive a credential stating that, e.g., he made a payment for a newspaper subscription. The user might want to use the credential at a later point in time or several times in the future to prove that the particular transaction took place, e.g., that the user is entitled to read articles in the newspaper.

The method and system for proving ownership of an electronic credential in accordance with the present invention is to be used in a communication system providing a public key encryption infrastructure. That is a system of public key encryption using digital certificates from certificate authorities and other registration authorities that verify and authenticate the validity of each party involved in an electronic transaction. The certificate authority, also called "Trusted Third Party", is an entity, typically a company, that issues digital certificates to other entities like organizations or individuals to allow them to prove their identity to others. The certificate authority might be an external company that offers digital certificate services or it might be an internal organization such as a corporate MIS (Management Information System) department. The Certificate Authority's chief function is to verify the identity of entities and issue digital certificates attesting to that identity.

In comparison, public key encryption is an encryption scheme, where each person gets a pair of keys, called the public key and the secret key. Each person's public key is published while the secret key is kept secret. Messages are encrypted using the intended recipient's public key and can only be decrypted using his secret key. This is mechanism can also be used for or in conjunction with a digital signature.

The digital signature is formed by extra data appended to a message which identifies and authenticates the sender and message data using public-key encryption. The sender uses a one-way hash function to generate a hash-code of, for example, 160 bits from the message data. He then encrypts the hash-code with his secret key. The receiver computes the hash-code from the data as well and decrypts the received hash with the sender's public key. If the two hash-codes are equal, the receiver can be sure that data has not been corrupted and that it came from the given sender.

The need for sender and receiver to share secret information, e.g., keys, via some secure channel is eliminated, since all communications involve only public keys, and no secret key is ever transmitted or shared. Public-key encryption can be used for authentication, confidentiality, integrity and non-repudiation. RSA encryption is an example of a public-key cryptography system.

The one-way hash function, also called "message digest function", used for the digital signature is a function which takes a variable-length message and produces a fixed-length hash. Given the hash it is computationally impossible to find a message with that hash. In fact, one cannot determine any usable information about a message with that hash, not even a single bit. For some one-way hash functions it is also computationally impossible to determine two messages which produce the same hash. A one-way hash function can be secret or public, just like an encryption function. A public one-way hash function can be used to speed up a public-key digital signature system. Rather than signing a long message which can take a long time, the one-way hash of the message is computed, and the hash is digitally signed.

A new credential system is described consisting of users and organizations. An organization knows a user only by a pseudonym. The pseudonyms of the same user, established for use with different organizations, cannot be linked. An organization can issue a credential to a pseudonym, and the corresponding user can prove possession of this credential to another organization that knows him under another pseudonym. During the prove of possession of the credential nothing besides the fact that he owns such a credential is revealed. In a refinement of the credential system there are credentials for unlimited use, so called multiple-show credentials, and credentials for one-time use, so called one-show credentials.

The method and system according to the present invention works as follows. In order to establish a pseudonym system a certificate authority accepts a user as a new participant in the pseudonym system by initially receiving a first public key provided by said user and an external public key being registered for said user with an external public key infrastructure. Then, the certificate authority verifies that the external public key is indeed registered with said external public key infrastructure. If this is the case the certificate authority receives an encryption of a secret key encrypted by using said first public key and proves that the secret key corresponding to said external public key is encrypted in said received encryption. Then, it computes a credential by signing the first public key using a secret key owned by said certificate authority and, finally, the certificate authority publishes the first public key, the certificate, the encryption and the name of the external public key infrastructure.

In a second aspect of the present invention to establishing a pseudonym system a user needs to get registered with an organization. To do so, the organization receives a first public key provided by said user and a first encryption of a first secret key encrypted by using said first public key. Then, it proves that an existing public key is registered for said user with said other organization of said pseudonym system and that the secret key corresponding to said existing public key is encrypted in said received first encryption. Then, the organization computes a credential by signing the first public key using a secret key owned by said organization and publishes the first public key, the certificate, the first encryption and the name of the other organization.

According to a third aspect of the present invention a verifier validates a credential shown by a user, whereby the credential is formed by a public key which is registered with a specified organization. Initially, the verifier receives a first public key provided by the user and an existing public key being registered for said user with the aforementioned organization. Then, the verifier verifies that the existing public key is indeed registered with said organization and receives a first encryption of a first secret key encrypted by using the first public key. Finally, the verifier proves that the secret key corresponding to the existing public key is encrypted in the received first encryption.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

BRIEF DESCRIPTION OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawing, wherein:

DETAILED DESCRIPTION OF THE INVENTION

Figure 1:
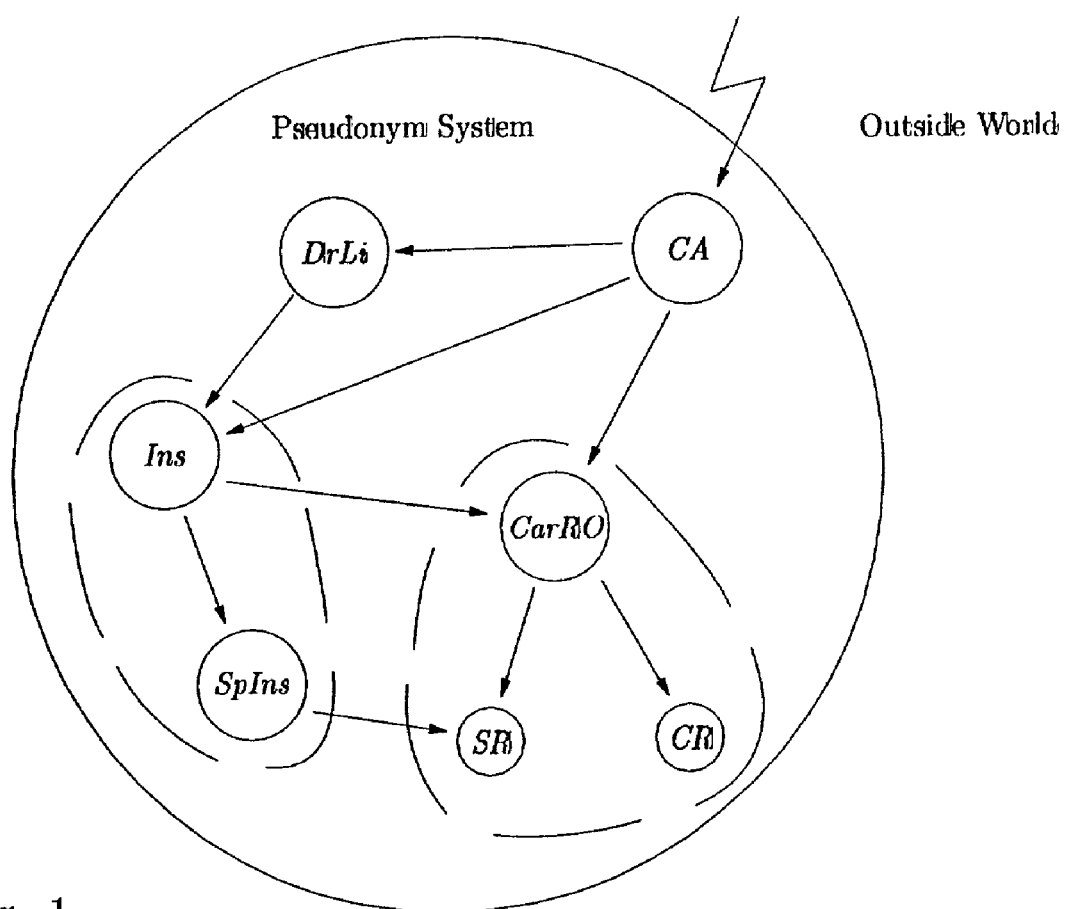
FIG. 1 shows a general layout of a pseudonym system according to the present invention.

With reference to FIG. 1, there is depicted a general layout of a pseudonym system according to the present invention. Within the pseudonym system there are five organizations, a certificate authority CA, an organization being able to issue a driver's license DrLi, an insurance company for normal cars Ins, an insurance company for sports cars Spins and a car rental organization CarRO. Furthermore, the pseudonym system includes two verifiers, a car rental agency CR and a sports car rental agency SR.

An arrow from X to Y means that the user showed to entity Y a credential issued to him by entity X. The dashed line groups organizations that trust each other to check various credentials properly. In the shown example of a pseudonym system a user is enabled to obtain a driver's license through organization DL, a car insurance through organization Ins, a sports car insurance through Spins, and access to a car rental through the car rental organization CarRO. The access to car rental is as follows.

The user first registers with the car rental organization CarRO which verifies that he is a valid user (has got a CA-credential) and has got a car-insurance (has an Ins-credential). In the given scenario the car rental organization does not need to worry whether or not the user has got a driver's license since the respective insurance is responsible and liable for that. Now, if the user wants to rent an ordinary car, he goes to the car rental agency CR which functions as a verifier and proves that he owns a credential from the car rental organizationCarRO. After he has proven that he owns the respective credential he will get a car.

However, if the user would like to rent a sports car, he goes to the sports car agency SR. There he shows that he owns not only a credential from the car rental organization CarRO but also from the sports car insurance Spins, i.e., that he has a special insurance for sports cars.

None of the credentials reveal any information about the user's real identity or pseudonym. However, the showing of credentials can be carried out in such a way that a designated revocation manager can later find the user's identity and/or pseudonyms. For instance, in case the user has a non-criminal car accident, the revocation manager reveals the pseudonym the user has with the corresponding insurance company and the cost of his insurance will go up. Whereas, if he has a criminal accident, then the revocation manager also reveals his real identity for further prosecution.

In the following all methods needed for the above scenario are described in greater detail.

Let $\{0, 1\}^*$ denote the set of all binary strings.

Computational problems are often modeled as decision problems: decide whether a given $x \in \{0, 1\}^*$ belongs to a language $L \subseteq \{0, 1\}^*$. P is the class of languages for which this can be decided in polynomial time. NP is the class of problems for which the decision whether x belongs to L can be verified in polynomial time when provided a credential (or witness) of this fact. Clearly $P \subseteq NP$.

Let $R \subseteq \{0, 1\}^* \times \{0, 1\}^*$ be a boolean relation. We say that R is "polynomially bounded" if there exists a polynomial $p(\cdot)$ such that $|w| \leq p(|x|)$ holds for all $(x, w) \in R$. Furthermore, R is an NP-relation if it is polynomially bounded and if there exists a polynomial-time algorithm for deciding membership of pairs $(x, w)$ in R. Finally, $$L_R = \{x | \exists w \text{ such that } (x, w) \in R\}$$

is the language defined by R.

A language L is in NP if there exists an NP-relation $R_L \subseteq \{0, 1\}^* \times \{0, 1\}^*$ such that $x \in L$ if and only if there exists a w such that $(x, w) \in R_L$. Such a w is called a witness of the membership of x in L. The set of all witnesses of x is denoted as $R_L(x)$.

It is known that for any NP-relation R, there exits a so-called proof of knowledge. Such a proof is a protocol between a prover and a verifier which allows the prover to convince the verifier that for some given value y he knows a value w such $(w, y)$ is contained in R. The protocol has the additional property although the verifier knows y, she does not get any information about w other than that such a value exists and that the prover knows it. Realization of such protocols for any relation R are described in Brassard et al. (G. Brassard, D. Chaum, and C. Crépeau. Minimum disclosure proofs of knowledge. Journal of Computer and System Sciences, 37(2):156-189, October 1988, or Boyar et al. J. Boyar, I. Damgaard, and R. Peralta; Short non-interactive cryptographic proofs; Journal of Cryptology, 13(4):449-472, October 2000). We will denote these methods as $$PK\{(\alpha):(\alpha, y) \in R\},$$

where Greek letters stand for the values the prover shows knowledge of and that the verifier does not learn whereas she learns all other parameters. Finally, $(\alpha, y) \in R$ is the statement that is proven, or, in other words, the conditions that the (secret) values the prover knows satisfy.

There exists also non-interactive variants of these protocols. They can be obtained from the interactive protocol using the so-called Fiat-Shamir heuristic (A. Fiat and A. Shamir; How to prove yourself: Practical solution to identification and signature problems; In A. M. Odlyzko, editor, Advances in Cryptology—CRYPTO '86, volume 263 of Lecture Notes in Computer Science, pages 186-194; Springer Verlag, 1987). The resulting protocol can also be seen as a digital signature. We denote them $$SPK\{(\alpha):(\alpha, y) \in R\}(m),$$

where SPK stands for signature based on a proof of knowledge, and m is the message that gets signed.

Let Enc and Dec denote the encryption and decryption algorithm of some public key encryption scheme. Let P be a public key of such a scheme and S be the corresponding secret key. Then $e = Enc_P(m)$ means that e is the encryption of some message m under public key P. Similarly, $d = Dec_S(e)$ means that d is the decryption of e using the secret key S, where $d = m$ if e is a valid encryption of m under P. If Enc is a probabilistic algorithm, then we write $e = Enc_P(m, r)$, where r contains all the random choices to be made, i.e., $Enc_P(., .)$ becomes a deterministic algorithm.

Let Sig and Ver denote signature generation and verification algorithm of some public key signature scheme. The algorithm Sig takes the secret key $x_s$ and a message m as input and outputs a signature $\sigma$ of m. On input of a message m, a signature $\sigma$, and the public key $y_s$ of a signer, the the algorithm Ver outputs true or false. The following must be satisfied.

$$Ver(m, \sigma, y_s) = \begin{cases} \text{true} & \text{if } Prob(\sigma = Sig(m, x_s)) > 0 \\ \text{false} & \text{otherwise} \end{cases}$$

Furthermore, a signature scheme must be unforgeable. This means that is must be infeasible to compute a signature of a message with respect to a public key without knowing the corresponding secret key.

Let $\|$ denote the concatenation of strings.

Now, the basic pseudonym scheme is described. It provides external PKI (Public Key Infrastructure) assured non-transferability. The following parties are involved: a certification authority $O_0 = CA$, organizations $O_1, O_2, \ldots$, and a user U. Let $P_{CA}$, $P_{O_1}$, and $P_{O_2}$ denote the respective public keys of the first three parties of some signature schemes and $S_{CA}$, $S_{O_1}$, and $S_{O_2}$ denote the respective secret keys.

For all protocols we assume that it is aborted as soon as some verification or check fails.

Let $P_U^{PKI}$ be use U's public key she has registered with an external PKI and let $S_U^{PKI}$ denote the corresponding secret key.

Let $fx: \{0, 1\}^* \rightarrow \{0, 1\}^*$ denote the (one-way) function that relates secret and public keys a users chooses with organization X. For instance, $P_U^{PKI} = f_{PKI}(S_U^{PKI})$ This function is part of the public key of X.

In the following the public key $P_U^{O_j}$ a user has established with some organization $O_j$ is considered the pseudonym of user U with $O_j$. In practice, $P_U^{O_j}$ might serve as key to a database where $O_j$ stores information it has collected about U.

Furthermore, in the following the term "showing of a credential" is used somewhat misleading to actually mean that the user proves possession of a credential. In particular, the user never reveals the credential itself to the party he proves possession (or "shows") of it.

The following first method describes how a new user enters the pseudonym system, i.e., registering with the CA.
1. User U chooses a new (random) secret key $S_U^{CA}$, computes $P_U^{CA} = f_{CA}(S_U^{CA})$, and sends $P_U^{CA}$ to CA.
2. User U sends CA her external public key $P_U^{PKI}$.
3. CA verifies that $P_U^{PKI}$ is indeed registered with the external PKI. (Depending on the actual use of the pseudonym system, the CA might have to check also thing other than his identity, whether he has sufficient income, sufficient assurance.)
4. U chooses a random r, computes $e_1^{CA} = Enc_{P_U^{CA}}(S_U^{PKI}, r)$, and sends $e_1^{CA}$ to CA
5. U proves the CA that the secret key corresponding to $P_U^{PKI}$ is encrypted in $e_1^{CA}$ under the public key $P_U^{CA}$. More formally, U proves the CA the following $$PK\{(\alpha, \beta): P_U^{PKI} = f_{PKI}(\alpha) \wedge e_1^{CA} = Enc_{P_U^{CA}}(\alpha, \beta)\}.$$

6. The CA computes the credential on $P_U^{CA}$, i.e., computes $C_U^{CA} = Sig(P_U^{CA}, S_{CA})$ and sends $c_U^{CA}$ to U.
7. CA publishes $(P_U^{CA}, c_U^{CA}, e_1^{CA}, PKI)$.

The following second method shows how a user registers with an organization $O_i$ and obtains a Credential from said organisation $O_i$, whereby $i > 1$, i.e., it covers all cases except of the initial registering with the CA as described above.
1. U chooses a new (random) secret key $S_U^{O_i}$, computes $P_U^{O_i} = f_{O_i}(S_U^{O_i})$, and sends $P_U^{O_i}$ to $O_i$.
2. Depending on the requirements of $O_i$, U has to prove to $O_i$ that U possesses credentials by various organizations (including CA). Assume that U has to prove $O_i$ the possession of a credential by $O_j$. If $O_i$ requires U to prove the possession of credentials from other organizations as well, then following steps are repeated for each of these organizations/credentials.

(a) U chooses a random r, computes $e_1^{(O_i, O_j)} = Enc_{P_U^{O_i}}(S_U^{O_j}, r)$, and sends $e_1^{(O_i, O_j)}$ to $O_i$.

(b) U proves to $O_i$ that it established a public key with $O_j$, that the corresponding secret key is encrypted in $e_1^{(O_i, O_j)}$ under the public key $P_U^{O_i}$, and that U owns a credential by $O_j$ (w.r.t. the public key U established with $O_j$). More formally, U proves $O_i$ the following $$PK\{(\alpha, \beta, \gamma, \delta): \alpha = f_{O_j}(\beta) \wedge e_1^{(O_i, O_j)} = Enc_{P_U^{O_i}}(\beta, \gamma) \wedge 1 = Ver(\alpha, \delta, P_{O_j})\}$$

3. Finally, $O_i$ computes a credential on $P_U^{O_i}$, i.e., computes $c_U^{O_i} = Sig(P_U^{O_i}, S_{O_i})$ and sends $c_U^{O_i}$ to U.

4. $O_i$ publishes the triple $(P_U^{O_i}, c^{UO_i}, e_1^{(O_i, O_j)}, O_j)$ for al $O_j$ for which it asked for the possession of credentials of.

It should be noted that all the steps of this protocol can be in fact executed at different times (as long as the order is kept). If this is done, then U has to send $O_i$ the public key $P_U^{O_i}$ before each of the steps to let $O_i$ resynchronize. Example: first step 1 is executed followed by step 2; At some later time, U sends $O_i$ $P_U^{O_i}$ again and they execute step 2 again, this time for credentials from different organization(s); finally step 3 is executed.

The encryptions $e_1^{(O_i, O_j)}$ ensure non-transferability: this is because in order to transfer a credential to another user U', user U needs to reveal $S_U^{O_i}$. Knowing this value, U' can compute $P_U^{O_i}$, lookup $e_1^{O_i, O_j}$, decrypt it, and obtain $S_U^{O_j}$. Repeating this process, U will finally be able to decrypt $e_1^{CA}$ and obtain the valuable external secret key of U.

The triple $(P_U^{O_i}, c_U^{O_i}, e_1^{(O_i, O_j)})$ can either be published by the organizations themselves or centrally at one place for the hole pseudonym system, e.g., the CA could maintain such a list (ordered by $P_U^{O_i}$).

Now, the same user shows a credential to a verifier V according to the following third method. In this method "multiple show" of the credential is possible.

In order to get access to some service, U has to show possession of a credential by the organization the verifier (service provider) V is associated with. Assume that U has to prove V the possession of a credential by $O_j$.

1. U proves to V that it established a public key with $O_j$, that U owns a credential by $O_j$ on that public key, and that U actually knows the corresponding secret key. More formally, U proves V the following $$PK\{(\alpha, \beta, \delta): \alpha = f_{O_j}(\beta) \wedge 1 = Ver(\alpha, \delta, P_{O_j})\}$$

In case V requires that U proves possession of credentials from several organizations, then V has to be treated like an organization. That is U and V follow the second method (including the publishing of the encryptions), with the exception that V does not issue a credential, i.e., step 3 is not executed. Note that if this is done, U has established a public key (pseudonym) with V.

It has to be acknowledged that in order to be fully anonymous, each time U wants to access the service provided by V he needs to engage again in the above protocol or according to the second method without step 3.

This following describes the additions to the methods from above to achieve all-or-nothing transferability.

No changes have to be applied in order to enter the pseudonym system, i.e., to register with the CA.

In order to register with $O_i$ and to obtaining a credential from $O_i$, i>1, the steps 2 and 4 of the second method need to be adapted. That is, step 2a and 2b are as follows.

2a'. U chooses a random $r_1$ and $r_2$, computes the two encryptions $e_1^{(O_i, O_j)} = Enc_{P_U^{O_i}}(S_U^{O_j}, r_1)$ and $e_2^{(O_i, O_j)} = Enc_{P_U^{O_i}}(S_U^{O_i}, r_2)$, and sends $e_1^{(O_i, O_j)}$ and $e_2^{(O_i, O_j)}$ to $O_i$.

2b'. U proves to $O_i$ that it established a public key with $O_j$, that the corresponding secret key is encrypted in $e_1^{(O_i, O_j)}$ under the public key $P_U^{O_i}$, and that U owns a credential by $O_j$ (w.r.t. the public key U established with $O_j$). Furthermore, U also proves that $e_2^{(O_i, O_j)}$ is an encryption of the secret key corresponding to $P_U^{O_i}$ under the public key U has established with $O_j$. More formally, U proves $O_i$ the following $$PK\{(\alpha, \beta, \gamma, \delta, \epsilon, \nu): \alpha = f_{O_j}(\beta) \wedge e_1^{O_s} i^{O_s} j = Enc_{PU_{si}\ O}P_U = f_{O_j}(\epsilon) \wedge e_2^{(O_i, O_j)} = Enc_\alpha(\epsilon, \nu)\}$$

Furthermore, step 4 becomes

4'. $O_i$ publishes the list $(P_U^{O_i}, c_U^{O_i}, e_1^{(O_i, O_j)}, e_2^{(O_i, O_j)}, O_j)$ for all $O_j$ for which it asked for the possession of credentials of.

The remark about publishing the encryption provided to $O_i$ by U made above applies here as well.

The encryptions $e_1^{(O_i, O_j)}$, $e_2^{(O_i, O_j)}$ ensure non-transferability: recall that to transfer a credential to another user U', user U needs to reveal $S_U^{O_i}$. Knowing this value, U' can compute $P_U^{O_i}$ lookup $e_1^{O_i, O_j}$, decrypt it, and obtain $S_U^{O_j}$. Repeating this process, U will finally be able get $S_U^{CA}$, decrypt $e_1^{CA}$ and obtain the valuable external secret key of U. Now, as U' known $S_U^{CA}$, he can also decrypt all $e_2^{(O_i, CA)}$ and get the secret keys U chose with any organization U had to prove possession of a credential by CA. Now, if U' knows the secret key U chose with organization $O_j$ and U needed to prove $O_i$, possession of a credential by $O_j$, user U' can get $e^{2(O_i, O_j)}$, decrypt it, and learn the secret key U chose with $O_i$. Repeating these process, U' will eventually get to know all secret keys user U chose and use all the credentials of user U. Thus, if a user transfers one credential to another user, he effectively transfers all of them.

No changes have to be applied to the third method in order to show a credential to a Verifier V under "multiple show".

In another refinement the above methods provide all-or-nothing non-transferability.

To enter the pseudonym system and to register with the CA, the steps 4, 5, and 7 can be omitted.

In order to register with $O_i$ and to obtain a credential from $O_i$, i>1, the same modification to the first method as previously explained have to be made.

The same method as before can be used to show a credential to a verifier V under "multiple show".

In another refinement the above methods provide revokability. Local anonymity revocation means that whenever U proved possession of a credential by $O_j$ to a party X, it is possible to some third party (revocation manager) to retrieve the pseudonym/public key U has established with $O_j$ from the information X obtained from U.

In the following $m_R$ be the text stating under which conditions the anonymity shall be revoked. This text can be unique to each showing of a credential. Is it understood that whenever the revocation manager is asked for revocation he will not reveal the pseudonym if the conditions stated in $m_R$ are not met. For instance, if $m_R$ states that revocation requires that the person that proved the possession of a credential needs to be involved in some crime, then the revocation manager will not revoke the anonymity until the requesting party can convince the revocation manager that the user at hand was indeed involved in some crime (c.f. the car accident example). In order to add local revokability, one has to apply the following changes to the respective methods. Of course, local revokability can also be added after other features were added.

To allow local revokability, each organization has to nominate a revocation manager who generates a public and secret key of a non-malleable encryption scheme, i.e., the revocation manager $R_i$ responsible for organization $O_i$ generates $S_{R_i}$ and $P_{R_i}$ and publishes $P_{R_i}$.

Entering the pseudonym system and registering with the CA works without further changes to the respective protocol.

For registering with $O_i$ and obtaining a credential from $O_i$, i>1, the step 2 has to be adapted. That is, steps 2a and 2b are as follows. Note that it can be decided separately for each execution of step 2 whether local revokability is required or not, i.e., whether the step is executed with the additions below, or not.

2a". U chooses a random $r_1$ and $r_3$, computes the two encryptions $e_1^{(O_i, O_j)} = Enc_{P_U{}^{O_i}}(S_U{}^{O_j}, r_1)$, and $v^{(O_i, R_j)} = Enc_{P_R{}^j}(P_U{}^{O_j} \| m_R, r_3)$ and sends $e_1^{(O_i, O_j)}$ and $v^{(O_i, R_j)}$ to $O_i$.

2b". U proves to $O_i$ that it established a public key with $O_j$, that the corresponding secret key is encrypted in $e_1^{(O_i, O_j)}$ under the public key $P_U{}^{O_i}$, and that U owns a credential by $O_j$ (w.r.t. the public key U established with $O_j$). Furthermore, U also proves that $v^{(O_i, O_j)}$ is an encryption of the public key U has established with $O_j$ under the $O_j$'s revocation manager's public key $P_{R_j}$. More formally, U proves $O_i$ the following $$PK\{(\alpha, \beta, \gamma, \delta, \epsilon, \nu): \alpha = f_{O_j}(\beta) \wedge e_1^{(O_i,O_j)} = Enc_{P^{O_i}}(\beta, \gamma) \wedge 1 = Ver(\alpha, \delta, P_{O_j}) \wedge v^{(O_i,R_j)} = Enc_{P_R^j}(\alpha \| m_R \nu)\}$$

Note that here we assumed that U and $O_i$ both trust the revocation manager $R_j$. However, it would also be possible that they agree upon a different revocation manager.

Showing a credential to a verifier V under "Multiple show" works as follows:

0". U chooses a random $r_3$, computes the encryption $v^{(V,R_j)} = Enc_{P_R{}^j}(P_U{}^{O_j} \| m_R, r_3)$ and sends $v^{(V,R_j)}$ to V.

1". U proves to V that it established a public key with $O_j$, that U owns a credential by $O_j$ on that public key, and that U actually known the corresponding secret key.

Furthermore, U also proves V that $v^{(V,R_j)}$ More formally, U proves V the following $$PK\{(\alpha, \beta, \delta, \gamma): \alpha = f_{O_j}(\beta) \wedge 1 = Ver(\alpha, \delta, P_{O_j}) \wedge v^{(O_i,R_j)} = Enc_{P_R^j}(\alpha \| m_R, \gamma)\}$$

With respect to showing credential of several organizations the same remark applies as aforementioned.

Global revokability is very similar to local revokability. Global revokability means basically showing possession of a CA-credential with (local) revokability as described in the previous section because when the pseudonym under which a users is known to the CA is revealed, the CA can determine the user's real identity.

In case proving possession of a credential to a verifier V needs global revokability, a user U, need to show V not only the credential of the associated organization but also the one of the CA. Thus, U and V need to execute the second method (with the extensions of the previous section) up to where credential are granted. As mentioned earlier, instead of publishing the encryptions obtained from U during the protocol's execution, V could send them to its associated organization for publication.

Note: In practice, when requiring global revokability for proving possession of a credential to a verifier V, one would probably also want local revokability. If this is the case, it would be easier to just have local revokability for proving possession of a credential to a verifier V and then ask for global revokability when the U registers with the organization associated with V.

The methods as described above can be used as "multi-show" credentials. However, the methods can be refined in a way to function as "one-show" credentials. A one-show credential is credential such that when a users shows it more than once then these different showings can be linked. (Note that although these showing can be linked, the pseudonym associated with the credential is not revealed. Hence anonymity is maintained.)

One-show credentials can be implemented in a similar manner as multi-show credential, but by having some extra information revealed about the credential such that using the credential more than once can be detected. One method to implement them is that each organization X publishes a suitable one-way function $\hat{f}x(\cdot)$. This function must have the property that, given $\hat{f}x(s)$ given $\hat{f}x(s')$ it is hard to decide whether s=s'.

Issuing a one-show credential is not different from issuing ordinary credentials. Therefore, the protocol for entering the pseudonym system and registering with the CA remains unchanged. However, the CA needs of course to publish a function $\hat{f}_{CA}$ as part of its public key and state that all credentials issued w.r.t. this public key are one-show credentials.

The step 2 of the second method has to be adapted to register with $O_i$ and to obtaining a credential from $O_i$, i>1. That is, steps 2a and 2b are as follows. Note that it can be decided separately for each execution of step 2 whether local revokability is required or not, i.e., whether the step is executed with the additions below, or not.

2a'". U chooses a random r, computes $e_1^{(O_i,O_j)} = Enc_{P_U{}^{O_i}}(S_U{}^{O_j}, r)$ and $\hat{P}_U{}^{O_j} = \hat{f}_{O_j}(S_U{}^{O_j})$, and sends $e_1^{O_j}$ and $\hat{P}_U{}^{O_j}$ to $O_i$.

2b'". U proves to $O_i$ that it established a public key with $O_j$, that the corresponding secret key is encrypted in $e_1^{(O_i,O_j)}$ under the public key $P_U{}^{O_i}$, and that U owns a credential by $O_j$ (w.r.t. the public key U established with $O_j$). Furthermore, U also proves that the preimage of $\hat{P}_U{}^{O_j}$ under under $\hat{f}_{O_j}$ is the secret key of the public key U has established with $O_j$. More formally, U proves $O_i$ the following $$PK\{(\alpha, \beta, \gamma, \delta, \epsilon, \nu): \alpha = f_{O_j}(\beta) \wedge e_1^{(O_i,O_j)} = Enc_{P_U{}^{O_i}}(\beta, \gamma) \wedge 1 = Ver(\alpha, \delta, P_{O_j}) \wedge \hat{P}_U{}^{O_j} = \hat{f}_{O_j}(\beta)\}$$

The organization $O_i$ can now tell whether some user showed a credential twice by checking whether it has seen $\hat{P}_U{}^{O_j}$ before. This might for instance be the case is a user wants to register twice with the same organizations.

The third method for proving possession to a verifier needs to be adapted as follows for one-show credentials.

0'". (new) U computes $\hat{P}_U{}^{O_j} = \hat{f}_{O_j}(S_U{}^{O_j})$ and sends $\hat{P}_U{}^{O_j}$ to V.

1'". U proves to V that it established a public key with $O_j$, that U owns a credential by $O_j$ on that public key, and that U actually known the corresponding secret key. Furthermore, U also proves that the pre-image of $\hat{P}_U{}^{O_j}$ under $\hat{f}_{O_j}$ is the secret key of the public key U has established with $O_j$. More formally, U proves V the following $$PK\{(\alpha, \beta, \delta, \gamma): \alpha = f_{O_j}(\beta) \wedge 1 = Ver(\beta, \delta, P_{O_j}) \wedge \hat{P}_U{}^{O_j} = \hat{f}_{O_j}(\beta)\}$$

The verifier V can now tell whether some user showed a credential twice by checking whether it has seen $\hat{P}_U^{O_j}$ before.

If a user wants or needs to obtain a second one-show credential from some organization, the two parties need of course to run the whole issuing protocol again, e.g., the user needs to chose a different $P_U^{O_j}$.

We can of course combine one-show credentials with the local and global revocation mechanism described above.

In principle a one-show certificate can also be used as a multi-show credential as they are basically the same credential, only that some additional information is revealed if it should be one-show. It is up to the system, whether credentials issued by organization X are one-show only as soon some as the function $_X$ is part of its public key. In practice, some policy stating when a credential is one-show and when multi-show would probably be part of the organizations' public keys.

A further refinement allows to have a build-in revocation. This kind of credentials are an extension of the one-show credentials described above in that provide build-in (local) revocation: if a users proves possession of the the same credential more than once (or, in general, k times), then his pseudonym with the issuing organization gets revealed directly, i.e., without the help of any revocation manager. However, if the users proves possession of the same credential only once (or less than k times), then the user remains anonymous. Note that this is different from the case where we have one-time credentials with local revocation. (In case the user is allowed prove possession of a credential up to k, these different showings are linkeable.)

In the following we describe the system such that showing a credential more than once reveals the user's identity. Similarly as described above, each organization X publishes two suitable one-way functions $\hat{f}_X(\cdot):\{0,1\}^* \to \{0,1\}^*$ and $\tilde{f}_X:\{0,1\}^* \times \{0,1\}^* \to \{0,1\}^*$. Furthermore, we require the function $\hat{f}_X$ to be homomorphic, i.e., that there are operations ★ and ⊕ such that $\hat{f}_X(a) \star \hat{f}_X(b) = \hat{f}_X(a \oplus b)$ holds for all a and b. This also defines "multiplication" with a scalar $c: \hat{f}_X(c \cdot a) = \hat{f}_X(a)^c$. Furthermore, $\hat{f}_X$ must have the property that, given $\hat{f}_X(s_1)$, $\hat{f}_X(s_2)$, $\hat{f}_X(s_3)$, $\hat{f}_X(s'_1)$, and $\hat{f}_X(s'_2, s'_3)$ it is hard to decide whether any of the relations $s_1 = s'_1$, $s_2 = s'_2$, and $s_3 = s'_3$ hold. (All these functions can be realized under the discrete logarithm or the RSA assumption.)

In the following the changes are described in case that the CA issues one-show credentials. Steps 1 and 6 of the first protocol needs to be modified as follows.

1''''. U chooses new (random) secret keys $S_U^{CA}$, $\tilde{S}'_U^{CA}$, $\tilde{S}''_U^{CA}$, computes the two public keys $P_U^{CA} = f_{CA}(S_U^{CA})$ and $\tilde{P}_U^{CA} = \tilde{f}_{CA}(\tilde{S}'_U^{CA}, \tilde{S}''_U^{CA})$, and sends $P_U^{CA}$ and $\tilde{P}_U^{CA}$ to CA.

6''''. The CA computes the credential on $P_U^{CA}$, $\tilde{P}_U^{CA}$, i.e., computes $c_U^{CA} = \text{Sig}(P_U^{CA} \| \tilde{P}_U^{CA}, P_{CA})$ and sends $c_U^{CA}$ to U.

In the following, it is assumed $(P_U^{CA}, \tilde{P}_U^{CA})$ as being one public key, i.e., the one that user U has established with organization X.

Now, it is described how a one-show credential with build-in revocation is issued by organization $O_i$ and we assume that $O_i$ wants to see a one-show credential with build-in revocation issued by $O_j$. From this description is should be clear how to issue such a credential when requiring to see an ordinary credential (or a one-show credential without built-in revocation) as well as how to issue ordinary credentials (or a one-show credential without built-in revocation) when requiring to see a credential with build-in revocation. Almost all steps of the second method are adapted.

1''''. U chooses a new (random) secret keys $S_U^{O_i}$, $\tilde{S}'_U^{O_i}$, $\tilde{S}''_U^{O_i}$, computes the two public keys $P_U^{O_i} = f_{O_i}(S_U^{O_i})$ and $\tilde{P}_U^{O_i} = \tilde{f}_{O_i}(\tilde{S}'_U^{O_i}, \tilde{S}''_U^{O_i})$, and sends $P_U^{O_i}$ and $\tilde{P}_U^{O_i}$ to $O_i$.

2''''. Depending on the requirements of $O_i$, user U has to prove to $O_i$ that U possesses credentials by various organizations (including CA). Assume that U has to prove $O_i$ the possession of a one-show credential with built-in revocation by $O_j$. If $O_i$ requires U to prove the possession of credential from other organizations as well, the following steps are repeated for each of these organizations/credentials.

(a) U chooses a random r, computes $e_1^{(O_i, O_j)} = \text{Enc}_{P_U^{O_j}}(S_U^{O_j} \| \tilde{S}'_U^{O_j} \| \tilde{S}''_U^{O_j}, r)$, $\hat{P}^{\hat{\imath}}_U^{O_j} = \hat{f}_{O_j}(\tilde{S}'_U^{O_j})$, and $\hat{P}^{\hat{n}}_U^{O_j} = \hat{f}_{O_j}(\tilde{S}''_U^{O_j})$, and sends $e_1^{O_j}$, $\hat{P}^{\hat{\imath}}_U^{O_j}$, and $\hat{P}^{\hat{n}}_U^{O_j}$ to $O_i$.

(b) U proves to $O_i$ that it established a public key with $O_j$, that the corresponding secret keys are encrypted in $e_1^{(O_i, O_j)}$ under the public key $P_U^{O_i}$, that the secret key of the second part of the public key established with $O_j$ are the pre-images of $\hat{P}^{\hat{\imath}}_U^{O_j}$ and $\hat{P}^{\hat{n}}_U^{O_j}$ under $\hat{f}_{O_j}$, and that U owns a credential by $O_j$ (w.r.t. the public keys U established with $O_j$). More formally, U proves $O_i$ the following $PK\{(\alpha, \beta, \gamma, \delta, \epsilon, \xi, \Phi): \alpha = f_{O_j}(\beta) \wedge \gamma = \tilde{f}_{O_j}(\delta, \epsilon)$
$\wedge e_1^{(O_i, O_j)} = \text{Enc}_{P_U^{O_j}}(\beta \| \delta \| \epsilon, \xi) \wedge 1 = \text{Ver}(\alpha \| \gamma, \Phi,$
$P_{O_j}) \wedge \hat{P}^{\hat{\imath}}_U^{O_j} = \hat{f}_{O_j}(\delta) \wedge \hat{P}^{\hat{n}}_U^{O_j} = \hat{f}_{O_j}(\epsilon)\}$ (c) (new step) $O_i$ chooses a random $w \in \{0, 1\}^l$, $u' \ne 0$, where l is a suitably defined security parameter, and sends w to U.

(d) (new step) U checks whether $w \ne 0$ and answers with $z = \tilde{S}'_U^{O_j} \oplus (w \cdot \tilde{S}'_U^{O_j})$ (e) (new step) $O_i$ checks whether $\hat{f}_{O_j}(z) = \hat{P}^{\hat{\imath}}_U^{O_j} \star (\hat{P}^{\hat{\imath}}_U^{O_j})^w$ 3''''. Finally, $O_i$ computes a credential on $P_U^{O_i}$, i.e., computes $c_U^{O_i} = \text{Sig}(P_U^{O_i} \| \tilde{P}_U^{O_i}, S_{O_i})$ and sends $c_U^{O_i}$ to U.

4''''. $O_i$ publishes the list $(P_U^{O_i}, c_U^{O_i}, e_1^{(O_i, O_j)}, O_j)$ for all $O_j$ for which it asked for the possession of credentials of.

When a users show the same credential more than once, $O_i$ will with high probability have chosen different w's and hence U will have replied with different z's. Given two different pairs of w and z, one gets two linear equations with the user's secrets $\tilde{S}'_U^{O_j}$ and $\tilde{S}''_U^{O_j}$ as unknowns. These secrets can be retrieved by solving the equations and thus $\tilde{P}_U^{O_i}$ computed which will identify the user.

The third protocol for proving possession to a verifier needs to be adapted as follows for one-show credentials with built-in revocation.

0''''. (new) U computes $\hat{P}'_U^{O_j} = \hat{f}_{O_j}(\tilde{S}'_U^{O_j})$ $\hat{P}''_U^{O_j} = \hat{f}_{O_j}(\tilde{S}''_U^{O_j})$ and sends $\hat{P}'_U^{O_j}$ and $\hat{P}''_U^{O_j}$ to V.

1''''. U proves to V that it established a public key with $O_j$, that U owns a credential by $O_j$ on that public key, and that U actually known the corresponding secret keys. Furthermore, U proves to V that the secret key of the second part of the public key established with $O_i$ are the pre-images of $\hat{P}^{\hat{\imath}}_U^{O_j}$ and $\hat{P}^{\hat{n}}_U^{O_j}$ under $\hat{f}_{O_j}$. More formally, U proves V the following $PK\}(\alpha, \beta, \gamma, \delta, \epsilon, \xi, \Phi): \alpha = f_{O_j}(\beta) \wedge \gamma = \tilde{f}_{O_j}(\delta,$
$\epsilon) \wedge 1 = \text{Ver}(\alpha \| \gamma, \Phi, P_{O_j}) \wedge \hat{P}^{\hat{\imath}}_U^{O_j} = \hat{f}_{O_j}(\delta) \wedge \hat{P}^{\hat{n}}_U^{O_j} = \tilde{f}_{O_j}(\epsilon) \wedge\}$ The verifier V can now tell whether some user showed a credential twice by checking whether it has seen $\hat{P}_U^{O_j}$ before and if this was the case compute the user's pseudonym.

Allowing a user to prove possession of a pseudonym up to k times can be done by letting the user choose k+1 additional secret keys (now 2) and then provide the image of all these key under $\hat{f}_X$ and prove the according statement in step 2b'''. The next steps of 2''' would need to be adapted.

As described in this section proving possession of the same credential more than the allowed number of times reveals only some of the user's secret key of the respective pseudonym. However, the system could be modified such that all the user's secret key of the respective pseudonym get revealed. Depending on the mechanism chosen for the non-transferability, this would mean that also the user's external secret key or all the secret keys he choose within the system. This would presents quite a strong initiative for the user not to show a credential more than the allowed number of times.

It is acknowledged that the feature in described above can easily be combined with other features.

Now, it is explained how one-show credentials could be used and provide the changes to the methods as described above such that our system can by applied for these usages of one-show credentials.

One-show credentials can be used for several reasons.

First, it can be used for tracking the the usage of some credential, e.g., to detect when the same credential is used with any verifier or to detect when the same credential is used with the same verifier, i.e., uses of the same credential with different verifiers cannot be linked. Second, it can be used for allowing the user to use a credential only once. This can be realized with the methods having the one-show credential ability added to it. In order to track the usage of a user's credential, all data collected when some user proves possession of a credential by an organization, say $O_j$, needs to be send to some central place, e.g., organization $O_{j'}$.

This can be realized with the methods having the one-show credential ability added with slight modifications applied. Now, showings of the same credential to different entities must no longer be linkeable. This can be achieved by using a different one-way function $\hat{f}_X$ for each entity possession of the credential is proved to rather than that it is specific for the issuer of the credential. To assure that showings to different entity are indeed not linkeable, the functions $\hat{f}_X$ must satisfy the following. Let $\hat{f}_{X_1}, \ldots, \hat{f}_{X_n}$ be such functions chosen be the entities $X_1$ through $X_n$ and let $O_j$ be the issuer of the credential. Then, given $\hat{f}_{X_1}(s_1), \ldots, \hat{f}_n(s_n)$, and $f_{O_j}(s')$ it must be hard to decide whether $s'=s_i$ for any $i$ in $1, \ldots, n$ and whether $s_i=s_k$ for any $i$ and $k\neq i$ in $1, \ldots, n$.

In case a user is not allowed to show a credential more than once (or, in general k times), e.g., if the credential represent electronic money, there are two ways to prevent a user from doing so. Both ways have in common that a user stays fully anonymous if he shows a credential only once (or less than k times). Both these ways are also known "double-spending" prevention mechanisms in digital money schemes (e.g., S. Brands; An efficient off-line electronic cash system based on the representation problem; Technical Report CS-R9323, CWI, April 1993 and D. Chaum, A. Fiat, and M. Naor; Untraceable electronic cash; In S. Goldwasser, editor, Advances in Cryptology—CRYPTO '88, volume 403 of Lecture Notes in Computer Science, pages 319-327; Springer Verlag, 1990).

In an on-line use, some entity keeps track of whether a credential was used already or not. This entity could either be the organization that issued the credential or some independent central party (possibly a different one for each organization issuing credentials). For this, the method as described above for one-show credentials can be used, with the following modification to the methods 2 and 3: after the organization $O_i$, resp. the verifier V, have obtained $\hat{P}_U^{O_j}$, they send it to the entity keeping track of whether a credentials has been used. If this entity finds $\hat{P}_U^{O_j}$ already in its database, it tells $O_i$, resp. V, that the credential was already used and is thus invalid (or, in general used more than the allowed number of times); otherwise it adds $\hat{P}_U^{O_j}$ to its database (and/or increases the related counter) and tells $O_i$, resp. V. Hence, $O_i$, resp. the verifier V will only accept the showing of a credential if the track-keeping entity says that the credential is still valid. Thus usage of a credential more than the allowed number of times is prevented. Note that the users' anonymity is still guaranteed.

In an off-line use, the usage of a credential more that the allowed number of times is not prevented but only detected. To disencourage users from over-using a credential, over-usage gets punished. For this the identity/pseudonym of a culprit must be known. However, the system should nevertheless protect innocent users. This can be achieved by using one-show credentials with build-in revocation as described in above. To detect the over-usage of a credential in cases it gets used with different verifiers/organizations, there needs to be an entity that collects all the transcripts of all showing these credentials similar as above, with the difference that now this entity needs not to be on-line during the showing credentials: it suffices if the verifiers/organizations sent the transcripts to this entity, e.g., once a day. Upon receiving this transcripts, this entity can check whether a credential was used more than the allowed number of times, and if this is the case, retrieve the culprits identity/pseudonym as described in above, and take according punishment measures.

In another refinement of the methods according to the present invention, the methods provide the ability to have a designated verifier. This is realized with a special kind of credentials having the property that a user can show these credentials only to a particular verifier. Moreover, the user cannot convince anyone else that the credential is valid.

For this to work, we need two things. First, each issuing organization published a homomorphic function $\hat{f}_X(\bullet, \bullet)$. Second, the designated verifier (a ordinary verifier V or an organization $O_i$) must have made available a public key of an homomorphic public key encryption scheme (e.g., P. Paillier, Public-key cryptosystems based on composite residuosity classes; in J. Stern, editor, Advances in Cryptology—EUROCRYPT '99, volume 1592 of Lecture Notes in Computer Science, pages 223-239; Springer Verlag, 1999).

Let $E_{V_i}$ and $D_{V_i}$ (resp, $E_{O_i}$ and $D_{O_i}$) denote the public and secret keys of the verifier (resp., organization) of such an encryption scheme. Thus due to the homomorphic property we will have that, e.g., $c=Dec_{D_V}(Enc_{E_V}{}^i(a, r_1)\star Enc_{E_V}(b, r_2))=a\oplus b$. Furthermore, we require that the homomorphic property of this encryption scheme is "compatible" with the homomorphic property of function $\hat{f}_X(\ )$. That is, for the above example, we require that $\hat{f}_X(c)=\hat{f}_X(a)\star\hat{f}_X(b)$.

Let $V_k$ be the designated verifier (which could be an ordinary verifier or an organization). In order to enter the pseudonym system, Step 1 of the first method needs to be divided into several steps:

1'''''(a) U chooses new (random) secret keys $S_U^{CA}$ and $\check{S}_U^{CA}$, computes $\check{P}=\hat{f}_{CA}(S_U^{CA}, \check{S}_U^{CA})$ and $P_U^{CA}=f_{CA}(S_U^{CA})$, and sends $\check{P}$ and $P_U^{CA}$ to CA, and proves CA the following $PK\{(\alpha, \beta):P_U^{CA}=f_{CA}(\alpha)\wedge\check{P}=\hat{f}_{CA}(\alpha, \beta)\}$ (b) CA chooses a random $\check{S}$ and an r, computes $\check{P}_U^{CA}=\check{P}\star\hat{f}_{CA}(0, \check{S})$ and $\check{z}_U^{(CA,V_k)}=Enc_{E_V}{}^k(\check{S},r)$, sends $\check{P}_U^{CA}$ and $\check{z}^{(CA,V_k)}$ to U, and proves U the following $PK=(\alpha, \beta):\check{P}_U^{CA}=\check{P}\star\hat{f}_{CA}(0, \alpha)\wedge\check{z}_U^{(CA,V_k)}=Enc_{E_V}{}^k(\alpha, \beta)\}.$ At the end of the protocol, we have $P_U^{CA}=\hat{f}_{CA}(S_U^{CA}, \check{S}_U^{CA}\oplus S)$, where S is encrypted in $\check{z}_U^{(CA,V_k)}=$under the encryption public key of the verifier $V_k$. Thus U does not know the pre-image of $\check{P}_U^{CA}$ under $\hat{f}_{CA}$.

This section describes how a designated verifier credential is issued by organization $O_i$. We assume that $O_i$ requires the possession of a a designated verifier credential issued by $O_j$, where $O_i$ is the designated verifier. From this description is should be clear how to issue such credential when requiring another type of credential as well as how to issue other types of credentials when requiring a designated verifier credential.

Almost all steps of the second method have to be adapted.

1''''. (a) U chooses new (random) secret keys $S_U^{O_i}$ and $\check{S}_U^{O_i}$, computes $\check{P} = f_{O_i}(S_U^{O_i}, \check{S}_U^{O_i})$ and $P_U^{O_i} = f_{O_i}(S_U^{O_i})$, sends $\check{P}$ and $P_U^{O_i}$ to $O_i$, and proves $O_i$ the following $$PK\{(\alpha, \beta): P_U^{O_i} = f_{O_i}(\alpha) \wedge \check{P} = f_{O_i}(\alpha, \beta)\}$$

(b) $O_i$ chooses a random $\check{S}$ and an r, computes $\check{P}_U^{O_i} = * \check{P} \star f_{O_i}(0, \check{S})$ and $\check{z}_U^{(O_i, V_k)} = Enc_{E_V}^k(\check{S}, r)$, sends $P_U^{O_i}$ and $\check{z}_U^{(O_i, V_k)}$ to U, and proves U the following $$PK\{(\alpha, \beta): \check{P}_U^{O_i} = \check{P} \star f_{O_i}(0, \alpha) \wedge \check{z}_U^{(O_i, V_k)} = Enc_{E_V}^k(\alpha, \beta)\}.$$

2''''. Depending on the requirements of $O_i$, user U has to prove to $O_i$ that U possesses credentials by various organizations (including CA). Assume that U has to prove $O_i$ the possession of a designated verifier credential by $O_j$. If $O_i$ requires U to prove the possession of credential from other organizations as well, the following steps are repeated for each of these organizations/credentials.

(a) U chooses random S', $r_1$, $r_2$, and computes $z = \check{z}_U^{(O_j, O_j)} \star Enc_{E_O}^z(S', r_1 S = \check{S}_U^{O_j} \ominus S'$, where $\ominus$ is defined as the inverse operation of $\oplus$. U also chooses a random r, computes $e_1^{(O_i, O_j)} = Enc_{P_U}^{O_i}(S_U^{O_j}, r_2)$, and sends z and $e_1^{O_j}$ to $O_i$.

(b) U proves to $O_i$ that it established a public key with $O_j$, that the corresponding secret keys are encrypted in $e_1^{(O_i, O_j)}$ under the public key $P_U^{O_i}$, and that U owns a credential by $O_j$ (w.r.t. the public keys U established with $O_j$). More formally, U proves $O_i$ the following $$\check{PK}\{(\alpha, \beta, \gamma, \delta, \epsilon): \alpha = f_{O_j}(\beta, \gamma) \wedge e_1^{(O_i, O_j)} = Enc_{P_U}^{O_i}(\beta, \delta) \wedge 1 = Ver(\alpha, \epsilon, P_{O_j})\}$$

The above method is $\check{PK}$ is not an ordinary proof of knowledge as all the other proofs considered so far because U does not know $\gamma$ (see explanation below).

3''''. Finally, $O_i$ computes a credential on $\check{P}_U^{O_i}$, i.e., computes $c_U^{O_i} = Sig(\check{P}_U^{O_i}, S_{O_i})$ and sends $c_U^{O_i}$ to U.

4''''. $O_i$ publishes the list $(P_U^{O_j}, c_U^{O_i}, e_1^{(O_i, O_j)}, O_j)$ for all $O_j$ for which it asked for the possession of credentials of.

As already mentioned, the method $\check{PK}\{(\alpha, \beta, \gamma, \delta, \epsilon): \alpha = f_{O_j}(\beta, \gamma) \wedge e_1^{(O_i, O_j)} = Enc_{P_U}^{O_i}(\beta, \delta) \wedge 1 = Ver(\alpha, \epsilon, P_{O_j})\}$ is not an ordinary proof of knowledge as described at the beginning. The reason is that the user does not known the value $\gamma$ because this value is shared between the user and the designated verifier (here $O_i$): from decrypting z the designated verifier $O_i$ knows a value, say $s_i$, such that $\check{P}_U^{O_j} = f_{O_j}(S_{O_j}, s_i \oplus S)$, where S and $S_{O_j}$ secrets known only to U. Therefore, $O_i$ and U can only together execute the above proof which now becomes a "multi-party computation" where both U and $O_i$ have secret inputs. The output of the computation will be 1 if and only if the secret inputs $\alpha, \beta, \gamma, \delta, \epsilon$ of the two parties satisfy $\alpha = f_{O_j}(\beta, \gamma) \wedge e_1^{(O_i, O_j)} = Enc_{P_U}^{O_i}(\beta, \delta) \wedge 1 = Ver(\alpha, \epsilon, P_{O_j})$. Technically, this can for instance be realized using techniques described in M. Ben-Or, S. Goldwasser, and A. Wigderson; Completeness theorems for non-cryptographic fault-tolerant distributed computation; In Proc. 20th Annual ACM Symposium on Theory of Computing (STOC), pages 1-10, 1988.

In order to allow the showing of a credential to a verifier V under "multiple-show" the third method is revised as follows:

0''''. (new) U chooses random S' and r, and computes $z = \check{z}_U^{(O_j, V)} \star Enc_{P_V}(\check{S}, r)$ and $S = \check{S}_U^{O_j} \ominus S'$, where $\ominus$ is defined as the inverse operation of $\oplus$. U and sends z to V.

1''''. U proves to V that it established a public key with $O_j$, and that U owns a designated verifier credential by $O_j$. More formally, U proves V the following $$\check{PK}\{(\alpha, \beta, \gamma, \delta): \alpha = f_{O_j}(\beta, \gamma) \wedge 1 = Ver(\alpha, \delta, P_{O_j})\}$$

With respect to the method $\check{PK}\{(\alpha, \beta, \gamma, \delta): \alpha = f_{O_j}(\beta, \gamma) \wedge 1 = Ver(\alpha, \delta, P_{O_j})\}$ the same remark as aforementioned applies.

The methods provided in section can easily be adapted such that a credential can be used for several designated verifiers. This can be achieved by having the issuing party encrypt their $\check{S}$ for each of the designated verifiers. Thus the users would obtain a $\check{z}_U^{(O_i, V_k)}$ for each of these verifiers.

Of course, all features can be added as well.

For some applications it might be necessary that issued credentials are consistent. That is if some friends that trust each other pool their credentials they might get some credentials they might not be able each individual might not be able to get otherwise. Whereas this is not a problem for, e.g., access to a database it is for credentials such as driver's licenses.

To enforce that credentials are consistent, we can require that a part of a user's secret remains the same for all pseudonym she generates. Thus the function $f_{O_i}$ needs to take two arguments, i.e., $f_{O_i}(\bullet, \bullet)$. Now, a user is required to prove that for all pseudonym of which she proves possession of the first argument to functions $f_{O_i}$ are the same.

Steps 1 of the first method need to be modified as follows, in order to enter the pseudonym system, i.e., to register with the CA.

1''''. U chooses a master secret keys $S_U^M$, and a second secret key $S_U^{CA}$, computes the public keys $P_U^{CA} = f_{CA}(S_U^M, S_U^{CA})$, and sends $P_U^{CA}$ to CA.

The step 2 has to be adapted to register with $O_i$ and to obtain a credential from $O_i$, i>1, that is, steps 2a and 2b are as follows. Note that it can be decided separately for each execution of step 2 whether local revokability is required or not, i.e., whether the step is executed with the additions below, or not.

1''''. U chooses a new (random) secret key $S_U^{O_i}$, computes $P_U^{O_i} = f_{O_i}(S_U^M, S_U^{O_i})$, and sends $P_U^{O_i}$ to $O_i$.

2b''''. U proves to $O_i$ that it established a public key with $O_j$, that the corresponding secret key is encrypted in $e^{i(O_i, O_j)}$ under the public key $P_U^{O_i}$ and that U owns a credential by $O_j$ (w.r.t. the public key U established with $O_j$). More formally, U proves V the following $$PK\{(\alpha, \beta, \gamma, \delta, \epsilon, \xi): \alpha = f_{O_j}(\epsilon, \beta) \wedge e_1^{(O_i, O_j)} = Enc_{P_U}^{O_i}(\beta, \gamma) \wedge 1 = Ver(\alpha, \delta, P_{O_j}) \wedge P_U^{O_i} = f_{O_i}(\epsilon, \xi)\}$$

Note that because the master secret key is the same for all pseudonyms, it is not needed to encrypt it in $e_1^{(O_i, O_j)}$.

Showing a credential to a verifier V (Multiple show) works as follows:

1''''U proves to V that it established a public key with $O_j$, and that U owns a designated verifier credential by $O_j$. More formally, U proves $O_i$ the following $$PK\{(\alpha, \beta, \gamma, \delta): \alpha = f_{O_j}(\beta, \gamma) \wedge 1 = Ver(\alpha, \delta, P_{O_j})\}$$

The fact that now pseudonyms of the same users contain the same master secret key allows a user to prove possession of several credential without first establishing a pseudonym with the verifier. Assume that U wants to prove V possession of credentials be $O_j$ and $O_k$. Then third method becomes as follows.

1''''''. U proves to V that it established a public key with $O_j$ and $O_k$, and that U owns a designated verifier credential by $O_j$ and $O_k$ More formally, U proves $O_i$ the following $$PK\{(\alpha, \beta, \gamma, \delta, \epsilon, \zeta, \eta): \alpha = f_{O_j}(\beta,\gamma) \wedge 1 = Ver(\alpha,\delta,P_{O_j})$$
$$\wedge \epsilon = f_{O_k}(\beta, \zeta) \wedge 1 = Ver(\epsilon, \eta, P_{O_k})\}$$

For the adaptions described in this section, it should obvious how the methods look like when combined with the other extensions.

Encoding an expiration date or other personalized attribute into a credential can be done in several ways. They could be encoded in the users' secret key $S_U^{O_i}$, the public keys $P_U^{O_i}$, or into the actual credential itself, e.g., $c_U^{O_i} = \text{Sig}(P_U^{O_i}\|attr, P_{O_j})$, where attr stands for the attribute that is checked. Thus, whenever a user proves the possession of a credential, he needs also to prove that the required attr is properly encoded. For the latter, the term $1 = Ver(\alpha, \delta, P_{O_j})$ in the various PK's would become $1 = Ver(\alpha\|attr, \delta P_{O_j})$.

If the showing methods are interactive, the party to whom a user proves possession of a credential cannot convince a third party that the method actually took place. This is due to the zero-knowledge property of the PK (sub-)methods. In case it is required that a third party can be convinced that a method took place, one can turn the PK submethods into the corresponding non-interactive SPK's. The message m that gets signed with such a SPK should contain all relevant information related to the respective instance of the showing method.

A scheme is said to provide pseudonymity only, if different showing of credentials are linkeable and non-anonymous. Our system can be used in such a way, if we require that whenever a users proves possession of a credential he also provides the public key established with the issuing organization and the credential in clear.

Previous pseudonym systems obtained PKI-assured non-transferability by requiring that all secret keys of users are constructed such each of them contains as a part the "external secret key" $S_U^{PKI}$. Thus, when a user transfers a credential he necessarily also needs to transfer the external secret key. This mechanism could of course also be used in our scheme (and be combined with the all-or-nothing transferability or any of the other features we described). If this mechanism is used the encryptions $e_1^{(O_j,O_i)}$ would no longer be necessary.

In the following we provide a description of how the credential system can be implement more efficiently. Before we can do so, however, we need to provide some building blocks.

Our construction is based on the decisional Diffie-Hellman assumption and the strong RSA assumption. It is provably secure in the random oracle model. In this section, we outline some of the less well-known technical points that will be used when we describe our protocols.

The flexible RSA problem is the following. Let $n = pq$ be a randomly generated RSA modulus. Let a random element z from $Z_n^*$ be given. Find an element $u \in Z_n^*$ and a number $e \in Z_{>1}$ such that $z \equiv u^e \pmod{n}$. The strong RSA assumption (SRSA) is that this problem is hard to solve. It is stronger than the traditional RSA assumption which states that given a modulus n and an exponent e it is hard to find $u, z \in Z_n^*$ such that $z \equiv u^e \pmod n$. Although both assumptions are stronger than assuming integer factorization to be hard, the only known way of solving the respective problems involves factoring the modulus.

The strong RSA assumption was independently introduced by Barić and Pfitzmann (Barić and Pfitzmann, 1997) and by Fujisaki and Okamoto (Fujisaki and Okamoto, 1997) and has subsequently proved instrumental for constructing existentially unforgeable signature schemes secure against adaptive chosen message attacks (Cramer and Shoup, 1999; Gennaro et al., 1999), and for constructing other important primitives such as group signatures (Ateniese et al., 2000; Camenisch and Michels, 1998) and verifiable secret sharing (Fujisaki and Okamoto, 1998).

Let $G=(g)$ denote a group of prime order q. The most basic protocol we consider is a zero-knowledge proof of knowledge of the discrete logarithm of some group element $y \in G$ to the base g (Chaum et al., 1988; Schnorr, 1991). We shortly recall this protocol and its properties: The prover knowing $x = \log_g y$ sends the verifier the commitment $t := g^r$, where $r \in_R Z_q$. Then, the verifier sends the prover a random challenge $c \in_R \{0, 1\}^k$ which he answers with the response $s := r - cx \pmod q$. (The integer $k \geq 1$ is a security parameter.) The verifier accepts if $t = g^s y^c$. Triples (t, c, s) with $t = g^s y^c$ are called accepting triples. As $x = \log_g y$ can be computed from two accepting triples (t, c, s) and $(t, \dot c, \dot s)$ with $c \neq \dot c$, i.e., $x := (s - \dot s)(\dot c - c)^{-1} \pmod q$, this protocol is a proof of knowledge of $\log_g y$. Furthermore, the protocol is honest-verifier zero-knowledge.[1] Using notation from (Camenisch and Stadler, 1997), this protocol is denoted $$PK\{(\alpha): y = g^\alpha\},$$

which can be read as "zero-knowledge Proof of Knowledge of $\alpha$ value a such that $y = g^\alpha$ holds." The convention is that Greek letters denote the quantity the knowledge of which is being proved, while all other parameters are known to the verifier. Using this notation, the proof can be described by just pointing out its aim while hiding all details. This helps to see what is proved and to understand the design of higher-level protocols.

[1] Thus it can be made zero-knowledge by requiring the verifier to commit to the challenge before she receives the prover's commitments.

These kinds of proofs of knowledge (PK) can be turned into signature schemes by the so-called Fiat-Shamir heuristic (Fiat and Shamir, 1987). That is, the prover determines the challenge c by applying a collision-resistant hash-function H to the commitment t and the message m that is signed, i.e., $c = H(t, m)$, and then computes the response as usual. The resulting signature consists of the challenge and the response. We denote such Signature schemes based on a zero-knowledge Proof of Knowledge (SPK) similarly as the PK's, e.g., $SPK\{(\alpha): y = g^\alpha\}(m)$. Such SPK's can be proved secure in the random oracle model (Bellare and Rogaway, 1993; Pointcheval, 1996) given the zero-knowledge and validity (soundness) properties of the underlying PK's.

In this paper we apply such PK's and SPK's to the group of quadratic residues modulo a composite n, i.e., $G = QR_n$. This choice for the underlying group has some consequences. First, the protocols are proofs of knowledge under the strong RSA assumption (Fujisaki and Okamoto, 1997). Second, the largest possible value $2^k - 1$ of the challenge c must be smaller that the smallest factor of G's order. This issue can be addressed by assuring that n is the product of two equal-sized safe primes, i.e., primes p and q such that $p' = (p-1)/2$ and $q' = (q-1)/2$ are prime (such p' and q' are called Sophie Germain primes). Then the order of $QR_n$ will be p'q' and values $k<(\log\sqrt{n})-4$ are fine. Third, soundness needs special attention in case the verifier is not equipped with the factorization of n as then deciding membership of $QR_n$ is believed to be hard. Thus the prover needs to convince the verifier that the elements he presents are indeed quadratic residues, i.e., that the square roots of the presented elements exist. This can in principle be done with a protocol by Fiat and Shamir (Fiat and Shamir, 1987). However, often it is sufficient to simply execute $PK\{(\alpha):y^2=(g^2)^\alpha\}$ instead of $PK\{(\alpha):y=g^\alpha\}$. The quantity a is defined as $\log_{g^2} y^2$, which is the same as $\log_g y$ in case y is a quadratic residue.

The following lists and reviews briefly those extensions of the basic $PK\{(\alpha):y=g^\alpha\}$ that we need as building blocks. We also cast these extensions in the notation explained above.

- A proof of knowledge of a representation of an element $y\in G$ with respect to several bases $z_1, \ldots, z_v \in G$ (Chaum et al., 1988) is denoted $PK\{(\alpha_1, \ldots, \alpha_1):y=z_1^{\alpha 1}, \ldots, z_v^{\alpha v}\}$.
- A proof of equality of discrete logarithms of two group elements $y_1, y_2 \in G$ to the bases $g \in G$ and $h \in G$, respectively, (Chaum, 1991; Chaum and Pedersen, 1993) is denoted $PK\{(\alpha):y_1=g^\alpha \wedge y_2=h^\alpha\}$. Generalizations to prove equalities among representations of the elements $y_1, \ldots, y_w \in G$ to bases $g_1, \ldots, g_v \in G$ are straight forward (Camenisch and Stadler, 1997).
- A proof of knowledge of a discrete logarithm of $y \in G$ with respect to $g \in G$ such that $\log_g y$ that lies in the integer interval [a, b] is denoted by $PK\{(\alpha):y=g^\alpha \wedge \alpha \in [a, b]\}$. Under the strong RSA assumption and if it is assured that the prover is not provided the factorization of the modulus (i.e., is not provided the order of the group) this proof can be done efficiently (Boudot, 2000) (it compares to about six ordinary $PK\{(\alpha):y=g^\alpha\}$.)
- The previous protocol can also be used to prove that the discrete logarithms of two group elements $y_1 \in G_1, y_2 \in G_1$ to the bases $g_1 \in G_1$ and $g_2 \in G_2$ in different groups $G_1$ and $G_2$ are equal (Brickell et al., 1988; Camenisch and Michels, 1999b). Let the order of the groups be $q_1$ and $q_2$, respectively. This proof can be realized only if both discrete logarithms lie in the interval $[0, \min\{q_1, q_2\}]$. The idea is that the prover commits to the discrete logarithm in some group, say $G=(g)=(h)$ the order of which he does not know, and then execute $PK\{(\alpha, \beta): y_1 \underline{G_1} g_1^\alpha \wedge y_2 \underline{G_2} g_2^\alpha \wedge C \underline{G} g^\alpha h^\beta \wedge \alpha \in [0, \min\{q_1, q_2\}]\}$, where C is the commitment.
- This kind of protocol generalizes to several different groups, to representations, and to arbitrary modular relations.

Verifiable encryption is a two-party protocol between a prover and encryptor P and a verifier and receiver V. Their common inputs are a public encryption key E, a public value υ, and a binary relation R on bit strings. As a result of the protocol, V either rejects or obtains the encryption e of some value s under E such that (s, υ)∈R. For instance, R could be the relation (s, $g^s$)⊂$Z_q \times G$. The protocol should ensure that V accepts an encryption of an invalid s only with negligible probability and that V learns nothing beyond the fact that the encryption contains some s with (s, υ)∈R. The encryption key E typically belongs to a third party, which is not involved in the protocol at all.

Generalizing the protocol of Asokan et al. (Asokan et al., 2000), Camenisch and Damgård (Camenisch and Damgård, 1998) provide a verifiable encryption scheme for all relations R that have an honest-verifier zero-knowledge three-move proof of knowledge where the second message is a random challenge and the witness can be computed from two transcripts with the same first message but different challenges. This includes most known proofs of knowledge, and all proofs about discrete logarithms from the previous section in particular.

Their verifiable encryption schemes is itself a three-move proof of knowledge of the encrypted witness s and is computationally zero-knowledge if a semantically secure encryption scheme is used (Camenisch and Damgård, 1998).

The basic idea of their scheme is that the prover starts the PK protocol for the relation he wants to prove, i.e., computes the commitment t. Then, he computes the responses so and $s_1$ to the challenges c=0 and c=1, encrypts these two responses under public key E, and sends these encryptions to the verifier. Receiving these, the verifier randomly chooses one of them and asks the prover to open it, thus obtaining a response to either c=0 or c=1. Finally the verifier accepts if the response is valid in the PK protocol w.r.t. the corresponding challenge. This procedure needs to be repeated sufficiently many times to obtain validity (i.e., such that the verifier is assured that at least on of the unopened encryptions also contains a valid response). It is easy to see that, assuming that the adversary will never gain access to the secret key for the underlying encryption scheme, the protocol is computational zero-knowledge if the PK is so and the encryption scheme is semantically secure. On the other hand, if the third party opens the second encryption as well, one gets two accepting triples and hence can compute the witness by the properties of the underlying PK. We refer to Camenisch and Damgård (Camenisch and Damgård, 1998) for further details and efficiency improvements.

We use a similar notation for verifiable encryption as for the PK's and denote by, e.g., $$e := VE(\text{ElGamal}, (g, y))\{\xi : \upsilon = g^\xi\}$$

the verifiable encryption protocol for the ElGamal scheme, whereby $\log_g \upsilon$ is encrypted in e under public key (y, g). Note that e is not a single encryption, but the verifier's entire transcript of the protocol and contains several encryptions, commitments and responses of the underlying PK.

Our scheme requires each user to encrypt each of her secret keys under one of her public keys, thereby creating "circular encryptions". However, the definition of a semantically secure encryption scheme does not provide security for such encryptions. Moreover, it is not known whether circular security is possible under general assumptions. In this paragraph we provide for the first time a construction for an encryption scheme that provides security for circular encryptions in the random oracle model given any semantically secure encryption scheme.

A semantically secure scheme G=(ε, D) on message space $\{0, 1\}^l$, is circular-secure if for all probabilistic polynomial time families of Turing machines $\{A_k\}$, for all sufficiently large k, for all n=poly(k), for all assignments to $(i_1, \ldots, i_n)$ and $(j_1, \ldots, j_n)$, $$|Pr[A_k(C, E_1, \ldots, E_n)=0|(E_1, D_1) \in_R G, \ldots, (E_n, D_n) \in_R G; C=(E_{i_1}(0), \ldots, E_{i_n}(0))] - Pr[A_k(C, E_1, \ldots, E_n)=0|(E_1,D) \in_R G, \ldots, (E_n, D_n) \in_R G; C=(E_{i_1}(D_{j_1}), \ldots, E_{i_n}(D_{j_n}))]| = \text{neg}(k)$$

(I.e., having access to encryptions of the secret keys does not help the adversary in breaking the semantic security of the system.)

Let H: $\{0, 1\}^* \to \{0, 1\}_k$ be a random oracle, and let ⊕ denote the bitwise XOR operation. Let g=(E, D) be a semantically secure cryptosystem. Construct g'=(E', D') as follows: generate (E, D) according to g. To encrypt, a message $m \in \{0, 1\}^k$, E' picks a random $r \in_R \{0, 1\}^l$ and sets $E'(m):=(E(r), H(r)\oplus m)$. To decrypt tuple (a, b), D' computes $\hat{m}:=H(D(a))\oplus b$.

If g is semantically secure, g' is a circular-secure.

As a basis for our circular encryption scheme, we use a variant of ElGamal encryption (ElGamal, 1985) where the public key $P=a^x b^v$ is derived from two bases a and b (of possibly unknown order) and two secret keys x and y. This variant of the ElGamal cryptosystem is known to be semantically secure under the decisional Diffie-Hellman assumption The resulting circular encryption scheme is as follows. Let the order $G=(a)=(b)$ be $\approx 2^l$. To encrypt a message $m \in \{0, 1\}^k$, choose a random element $r_1 \in G$ and a random integer $r_2 \in \{0, 1\}^{2l}$, and compute the encryption $$(u, v, w, z):=(P^{r_2}r_1, a^{r_2}, b^{r_2}, H(r_1)\oplus m).$$

Decryption works by computing $$\mathcal{H}\left(\frac{u}{v^x w^y}\right) \oplus z.$$

We denote this encryption scheme by CEIG and write, e.g., VE(CEIG, (H, a, b, P)){ξ: $v=g^\xi$} when using it for verifiable encryption.

Our pseudonym system requires a prover to verifiably encrypt under a public key that is not revealed to the verifier, that is, the verifier gets to see only a commitment to this public key. Moreover, the prover knows the secret key corresponding to this public key.

Recall that verifiable encryption protocol described earlier demands that prover opens encryptions. In case the verifier knows the encryption public key, the prover can provably open an encryption just by providing the message and all random choices she made. The verifier then just re-runs the encryption algorithm and checks whether this results in the same encryption. In case the verifier does not know the encryption public key, however, this does not work. In the following we describe how the prover can nevertheless convince the verifier that an encryption contains the value she claims. We will use the same encryption scheme as in the previous section, i.e., $P=a^x b^y$ serves as public key, and x and y as the corresponding secret keys. Let $C=Pg^r$ be the commitment to P, where g is a third random generator of $G=(a)=(b)$, and let $(u, v, w, z)=(P^{r_2}r_1, a^{r_2}, b^{r_2}, H(r_1)\oplus m)$ be an encryption of m as above. To convince the verifier that m is indeed encrypted in (u, v, w, z) under the public key committed to by C, the prover reveals $r_1$ and engages with the verifier in $$PK\{(\alpha, \beta, \gamma, \delta): C=a^\alpha b^\beta g^\gamma \wedge v=a^\delta \wedge w=b^\delta \wedge u/r_1=v^\alpha w^\beta\}.$$

The verifier further needs to check if $z=H(r_1)\oplus m$.

In the following, we write, e.g., VE(C-CEIG, (H, a, b, g, C)){ξ:$v=g^\xi$} for verifiable encryption with committed encryption public key.

We first describe our basic pseudonym system with all-or-nothing and PKI-assured non-transferability. The basic system compromises protocols for a user to join the system, register with an organization, obtaining multi-show credentials, and showing such credentials. We will then describe extensions that allow for one-show credentials as well and for revocability.

Throughout we assume that the users and organizations are connected by perfectly anonymous channels. Furthermore, we assume that for each protocol the organizations authenticates itself towards the users and that they establish a secure channel between them for each session. For any protocol we describe, we implicitly assume that is some check or sub-protocol (e.g., some proof of knowledge PK) fails for some party, it informs the other participating parties of this and stops.

In the following we use CA and $O_0$ as interchangeable names for the pseudonym system's certification authority.

Our basic system is composed of the protocols presented below in the following way.

System setup: The system parameters are agreed upon and all organizations (including the CA) choose their keys and make the public keys available. It is possible that organizations (apart from the CA join and leave at any time.

A User Joining the System/Registering with the CA:
1. User U identifies herself towards the CA who checks that she is eligible to join the system.
2. U chooses a random nym master secret $x_u \in \Gamma$.
3. They run Protocol 1 to establish U pseudonym $P_U^{CA}$ with the CA.
4. Depending on whether we want to have PKI-assured non-transferability, U and CA run Protocol 5.
5. $O_i$ grants U a credential, i.e., they run Protocol 2.

A User Registering with Organization $O_i$ and Obtaining a Credential from $O_i$:
1. U and $O_i$ run Protocol 1 to establish U pseudonym $P_U^{O_i}$ with $O_i$.
2. Let O be the set of organizations of which U must possess a credential in order to obtain a credential from $O_i$. For each $O_j \in O$, user U and $O_j$ carry out Protocol 4.
3. The CA grants U a credential, i.e., they run Protocol 2. Note that the above steps could be executed at different times.

A User Accessing a Service:
Case I. Assume that a U wants to access some service from V and that to do so U needs to hold a credential by $O_j$. If this is the case, U can access the service by executing Protocol 3 with V.
Case II. In case U is required to hold credential from a set O of organizations, U must first establish a pseudonym with V, i.e., run Protocol 1, and then run Protocol 4 for each $O_j \in O$. If it is understood that the established pseudonym is one-time, i.e., if U is not allowed to access the service again just be proving ownership of the established pseudonym, U and V need not execute the steps 4:3 and 4:2 of the latter protocol.

The system parameter and key generation work as follows. For simplicity we assume some common system parameter: the length of RSA moduli $l_n$, the integer intervals $\Gamma=-]-2^{l_\Gamma}, 2^{l_\Gamma}[, \Delta=]-2^{l_\Delta}, 2^{l_\Delta}[, \Lambda=]2^{l_\Lambda}, 2^{l_\Delta+l_\Sigma}[$ such that $l_\Delta=\Delta l_\Gamma$ and $l_\Gamma=2l_n$, where $\Delta>1$ is a security parameter, and $2^{l_\Lambda}>2(2^{2l_\Gamma}+2^{l_\Gamma}+2^{l_\Delta})$, and $2(2^{l_\Sigma}(2^{2l_\Gamma}+2^{l_\Delta})+2^{l_\Delta})<2^{l_\Lambda}$.

Each organization $O_i$ (including the CA) chooses random $l_n/2$-bit primes $p'_{O_i}, q'_{O_i}$ such that $p_{O_i}=2p'+1$ and $q_{O_i}=2q'+1$ are prime and sets modulus $n_{O_i}=p_{O_i} q_{O_i}$. It also chooses random elements $a_{O_i}, b_{O_i}, d_{O_i}, g_{O_i}, h_{O_i} \in QR_{n_{O_i}}$. It stores $S_{O_i}:=(p_{O_i}, q_{O_i})$ as its secret keys and publishes $P_{O_i}:=(n_{O_i}, a_{O_i}, b_{O_i}, d_{O_i}, g_{O_i}, h_{O_i})$ as its public key together with a proof that $n_{O_i}$ is the product of two safe primes (see (Camenisch and Michels, 1999a) for how the latter can be done) and that the elements $a_{O_i}, b_{O_i}, d_{O_i}, g_{O_i}, h_{O_i}$ lie indeed in $QR_{n_{O_i}}$ (this can be done by providing their roots; then, to check that an element s has order at least p'q', one needs only to test whether $\gcd(s \pm 1, n_{O_i})=1$).

This paragraph describes how a user U establishes a pseudonym with organization $O_i$.

Let $x_U \in \Gamma$ be the U's nym master secret. In case $O_i$ is the CA, i.e., U has no yet entered the system, U needs to choose a random $x_U \in_R \Gamma$ before entering the protocol below. We will see later how it is ensured that U uses the same $x_u$ with other organizations.

To establish a pseudonym $P_U^{O_i}$ with $O_i$, user U engages in Protocol 1 with $O_i$. The protocol assures that the established pseudonym is of the right form, i e.

$$P_U^{O_i} = a_{O_i}^{x_U} b_{O_i}^{s_U^{O_i}},$$

with $x_U \in \Gamma$ and $s^{UO_i} \in \Delta$. The value $s_U^{O_i}$ is chosen by jointly by $O_i$ and U but without $O_i$ learning anything about both values. Note that this protocol does not assure that U uses the $x_U$ same $x_U$ as with other organizations as well; this is taken care of later in Protocol 4.

Protocol 1.

1:1. U chooses random $r_1 \in_R \Delta$ and $r_2, r_3 \in_R \{0, 1\}^{2l_n}$, computes $C_1 = g_{O_i}^{r_1} h_{O_i}^{r_2}$ and $C_2 = g_{O_i}^{x_U} h_{O_i}^{r_3}$, and sends $C_1$ to $O_i$.

1:2. U engages with $O_i$ in PK$\{(\alpha, \beta, \gamma, \delta): C_1^2 = (g_{O_i}^2)^\alpha (h_{O_i}^2)^\beta \wedge C_2^2 = (g_{O_i}^2)^\gamma (h_{O_i}^2)^\delta\}$ proving that U formed $C_1$ and $C_2$ correctly.

1:3. $O_i$ chooses a random $r \in_R \Delta$ and sends $r$ to U.

1:4. U chooses $r_4 \in_R \{0, 1\}^{l_n}$, computes $s_U^{O_i} = (r_1 + r \mod (2^{l_\Delta+1}+1)) - 2^{l_\Delta}+1$, $$\tilde{s} = \left\lfloor \frac{r_1 + r}{2^{l_\Delta+1}+1} \right\rfloor,$$

$$P_U^{O_i} = a_{O_i}^{x_U} b_{O_i}^{s_U^{O_i}}, \quad C_3 = g_{O_i}^{\tilde{s}} h_{O_i}^{r_4},$$

and sends $P_U^{O_i}$ and $C_3$ to $O_i$.

1:5. U engages with $O_i$ in

PK$\{(\alpha, \beta, \gamma, \delta, \epsilon, \zeta, \theta, \nu): C_1^2 = (g_{O_i}^2)^\alpha (h_{O_i}^2)^\beta \wedge C_2^2 = (g_{O_i}^2)^\gamma (h_{O_i}^2)^\delta \delta C_3^2 = (g_{O_i}^2)^\epsilon (h_{O_i}^2)^\zeta \wedge (P_U^{O_i})^2 = (a_{O_i}^2)^\gamma (b_{O_i}^2)^\theta \wedge (C_1^2 (g_{O_i}^2)^{(r-2^{l_\Delta}+1)})/(C_3^2)^{(2^{l_\Delta+1}+1)} = (g_{O_i}^2)^\theta (h_{O_i}^2)^\zeta \wedge \gamma \in \Gamma \wedge \theta \in \Delta\}$ proving that U formed $P_U^{O_i}$ and $C_3$ correctly.

1:6. $O_i$ stores $(P_U^{O_i})^2$ and $P_U^{O_i}$.

1:7. U stores $(P_U^{O_i})^2$, $P_U^{O_i}$, and $s_U^{O_i}$.

Let us explain the steps of this protocol in more detail. First, U commits to $x_U$ and to her contribution $r_1$ to $s_U^{O_i}$. She sends $O_i$ these commitments and proves to $O_i$ that she knows the committed values (this proof is necessary already at this point of the protocol for the security proof to work). After this, $O_i$ chooses its contribution $r$ to $s_U^{O_i}$ and sends it to U, who computes $s_U^{O_i}$ and $P_U^{O_i}$ sends $P_U^{O_i}$ to $O_i$, and proves that she computes $P_U^{O_i}$ correctly, i.e., that $s_U^{O_i}$ lies in $\Delta$ and is computed correctly from $r$ and the value she committed to earlier in $C_2$. For technical reasons, we consider $P$ and $\tilde{P}$ to be the same pseudonym if $p^2 = \tilde{p}^2$.

We now describe how a credential can be generated efficiently.

A credential a pseudonym P issued by $O_i$ is a pair $(c, e)$ $\in Z^*_{n_O^i}$ such that $(Pd_O)^e \equiv c \pmod{n_O}$. To generate a credential on a priorly established pseudonym $P_U^{O_i}$, organization $O_i$ and user U carry out the following protocol.

Protocol 2.

2:1. U identifies as owner of $P_U^{O_i}$ by engaging in protocol PK$\{(\alpha, \beta): (P_U^{O_i})^2 = (a_{O_i}^2)^\alpha (b_{O_i}^2)^\beta\}$ with $O_i$.

2:2. $O_i$ looks up $P_U^{O_i}$, chooses a random prime $e_U^{O_i} \in_R \Lambda$, computes $$c_U^{O_i} = (P_U^{O_i} d_{O_i}) 1 / e_U^{O_i}$$

mod $n_{O_i}$, sends $c_U^{O_i}$ to U, and stores $c_U^{O_i}$ together with $P_U^{O_i}$.

2:3. U checks whether $$c_U^{O_i e_U^{O_i}} \equiv P_U^{O_i} d_{O_i} \pmod{n_{O_i}}$$

and stores $(c_U^{O_i}, e_U^{O_i})$ together with $P_U^{O_i}$.

Step 2:1 can of course be omitted if the Protocol 2 takes place in the same session as some other protocol where U already proved ownership of $P_U^{O_i}$.

The following paragraph describes how showing a single credential can be implemented efficiently.

Assume a user U wants to prove possession of a certificate by organization $O_j$ to a verifier V. They engage in the following protocol.

Protocol 3.

3:1. U chooses $r_1, r_2 \in_R \{0, 1\}^{2l_n}$, computes $A = c_U^{O_j} h_{O_j}^{r_1}$ and $B = h_{O_j}^{r_1} g_{O_j}^{r_2}$, and sends A, B to V.

3:2. U engages with V in

PK$\{(\alpha, \beta, \gamma, \delta, \epsilon, \zeta, \xi): d_{O_j}^2 = (A^2)^\alpha (1/(a_{O_j}^2))^\beta (1/(b_{O_j}^2))^\gamma (1/(h_{O_j}^2))^\delta \wedge B^2 = (h_{O_j}^2)^\epsilon (g_{O_j}^2)^\zeta \wedge 1 = (B^2)^\alpha (1/(h_{O_j}^2))^\delta (1/(g_{O_j}^2))^\xi \wedge \beta \in \Gamma \wedge \gamma \in \Lambda \wedge \alpha \in \Lambda\}.$ The PK in step 3:2 proves that U possess a credential issued by $O_i$ on some pseudonym registered with $O_j$.

The following paragraph describes how showing a credential with respect to a pseudonym can be implemented efficiently.

Assume a user U wants to prove possession of a certificate by organization $O_j$ to an organization $O_i$ with whom U established $P_U^{O_i}$. That means $O_i$ not only wants to be assured that U owns a credential by $O_j$ but also that the pseudonym connected with this credential contains on the same master secret key as $P_U^{O_i}$. Moreover, the protocol also assures that if U would give the secrets of $P_U^{O_i}$ to one of her friends, then she would also reveal the secret keys of the pseudonym established with $O_j$ and vice versa, whereby all-or-nothing transferability gets assured. Thus U and $O_i$ engage in the following protocol (in which we assume that $O_i$ has already established that $P_U^{O_i} \in QR_{n_0}^i$).

Protocol 4.

4:1. U chooses random $r_1, r_2, r_3 \in_R \{0, 1\}^{2l_n}$, computes $A = c_U^{O_j} h_{O_j}^{r_1}$, $B = h_{O_j}^{r_1} g_{O_j}^{r_2}$, and $C = P_U^{O_j} h_{O_j}^{r_3}$, and sends A, B, C to $O_i$.

4:2. U engages with $O_i$ in

PK$\{(\alpha, \beta, \gamma, \delta, \epsilon, \zeta, \xi, \eta, \Phi): d_{O_j}^2 = (A^2)^\alpha (1/(a_{O_j}^2))^\beta (1/(b_{O_j}^2))^\gamma (1/(h_{O_j}^2))^\delta \wedge B^2 = (h_{O_j}^2)^\epsilon (g_{O_j}^2)^\zeta \wedge 1 = (B^2)^\alpha (1/(h_{O_j}^2))^\delta (1/(g_{O_j}^2))^\xi \wedge (P_U^{O_i})^2 = (a_{O_i}^2)^\beta (b_{O_i}^2)^\eta \wedge C^2 = (a_{O_j}^2)^\beta (b_{O_j}^2)^\gamma (h_{O_j}^2)^\Phi \wedge \beta \in \Gamma \wedge \gamma \in \Delta \wedge \alpha \in \Lambda\}.$ 4:3. U and $O_i$ engage in the verifiable encryption protocols $$v_{(P_U^{O_i}, O_j)} = VE(CEIG, (H(a_{O_i})^2, b_{O_i}^2, (P_U^{O_i})^2))\{(\alpha, \beta, \gamma) : C^2$$

$$= (a_{O_j}^2)^\alpha (b_{O_j}^2)^\beta (h_{O_j}^2)^\gamma\} \text{ and}$$

$$w_{(P_U^{O_i}, O_j)} = VE(C - CEIG, (H, a_{O_j}^2, b_{O_j}^2, h_{O_j}^2, C^2))\{(\alpha, \beta) : (P_U^{O_i})^2$$

$$= (a_{O_i}^2)^\alpha (b_{O_i}^2)^\beta\}.$$

4:4. $O_i$ publishes the list $(v_{(P_U^{o_2}, O_j)}, w_{(P_U^{o_2}, O_j)}, P_U^{O_i}, e_U^{O_i}, c_U^{O_i})$.

The first two steps of this protocol are similar to the ones of Protocol 3, the difference being that here U also commits in C to the pseudonym established with $O_j$, and proving that this is indeed the case. This commitment is need for the encryption is step 4:3. In this step all-or-nothing transferability is achieved by (1) verifiably encrypting the secrets keys of the pseudonym U established with $O_j$ using $P_U^{O_i}$ as the encryption public key (cf. Section ) and (2) verifiably encrypt the secret keys of $P_U^{O_i}$ using the pseudonym committed in $C^2$ as encryption public key (cf. Section ).

In case we want to have PKI-assured non-transferability only, the steps 4:3 and 4:2 can be omitted. Furthermore, C is not necessary either and can be dropped.

In this paragraph we show how to ensure that if a user gives away his master secret $x_U$, then he will also reveal the secret key of an "external" valuable public key $PK_U$. This is achieved by having the CA ask for this public key $PK_U$ and check whether this is the user's public key (e.g., via some external certificate) and then require the user to verifiable encrypt the corresponding secret key such that it can be We give an example for how this protocol look in case that U external public key $Y_U$ is discrete logarithm based, i.e., $Y^U = g^x$ for some generator g. Other cases are similar.

Protocol 5.

5:1. U sends $Y_U$ and g to CA together with the certificate on $Y^U$ of the external PKI. The CA checks the validity of $Y_U$.

5:2. U and CA engage in the protocol $$w_{(P_U^{(O_i, O_j)}} = VE(CEIG, (H, a_{O_0}^2, b_{O_0}^2, (P_U^{O_0})^2))\{(\alpha, \beta) : Y_U = g^\alpha\}.$$

The following describes how one show credentials can be implemented efficiently. The credential we considered so far can be shown an unlimited number of times. However, for some services it might be required that a credential can only be used once. Of course, one possibility would be that a user just reveals the credential to the verifier in clean. This, however, would mean that the user is not fully anonymous any more as the verifier and the organization then both know the credential and thus can link the transaction to the user's pseudonym. Traditionally this problem has been solved using so-called blind signatures (Chaum, 1983). Here, we provide a novel and alternative way to approach this problem, i.e., instead of blinding the signer we blind the verifier. This approach could also be used to implement anonymous e-cash (just consider a credential to be money).

In the following we describe the general idea how it is realized. The resulting changes that would have to be made to the individual protocol we do not provide.

Each organization published an additional provably random generator $z_{O_i} \in QR_{n_O}^j$.

A user's pseudonym is formed slightly different:

$$P_U^{O_i} = a_{O_i}^{x_U} b_{O_i}^{s_U^{O_i}} r_U^{O_i} z_{O_i},$$

where $r_U^{O_i}$ is chosen be $O_i$ and U together in the same way as is $s_U^{O_i}$.

Credential are issued in the very same way as before, i.e., U obtains $c^{UO_i}$ and $e_U^{O_i}$ such that $$c_U^{O_i e_U^{O_i}} \equiv P_U^{O_i} d_{O_i} (\text{mod } n_{O_i}) \text{ holds.}$$

When proving possession of a one-show credential issued by $O_j$ (with respect to a pseudonym or not), the user provides the verifier V (which might be an organization) the value $$H_U^{O_j} = h_{O_j}^{r_U^{O_j}}$$

and proves that it is formed correctly w.r.t. to the pseudonym U established with $O_j$. Of course, the various PK's in these protocols have to be adapted to reflect the different form of the pseudonym U holds with $O_j$.

Now, different usages of the same credential can be linked to each other but not to the user's pseudonym with the issuing organization. This allows to prevent users from using the same credential several times, if the verifier checks with the issuing organization whether $H_U^{O_j}$ was already used or not, similar as it is done for anonymous "on-line" e-cash. Off-line checking could be done as well. As here double usage can only be detected but not prevented, a mechanism for identifying "double-users" is required. This could for instance be achieved using revocation as described in the previous section, or using similar techniques that are used in for anonymous "off-line" e-cash (e.g., (Brands, 1993)). The latter could be done such that using a one-show credential twice would expose the user's secret keys connected with corresponding pseudonym. Together with non-transferability this would be quite a strong incentive for the users not to use one-show credentials twice.

We now describe how local and global revocation can be implemented efficiently. To enable local and global revocation each organization needs a revocation manager. Given the transaction of a protocol where some user proved possession of a credential issued by organization $O_i$, this organization's revocation manager $R_i$ will have the task to reveal the pseudonym under which the user is known to $O_i$ Each of these managers needs to choose keys of some non-malleable public key encryption scheme. The managers' public keys become part of the respective organizations' public keys. In the following we describe how the protocols for proving possession of a credential must be adapted such that local revocation is possible using Cramer-Shoup encryption (Cramer and Shoup, 1998). We then discuss global revocation. We remark that it can be decided at the time when the possession of a credential is proved whether local and/or global revocation shall be possible for the transaction at hand.

Setup: Each $R_i$ chooses a group $H_{R_i}$ of (large) prime order $q_{R_i}$, two provably random generators $g_{R_i}$ and $h_{R_i}$, and five secret keys $x_{(1,R_i)}, \ldots, x_{(5,R_i)} \in_R \mathbb{Z}_{qR_i}$ and computes $$(y_{(1,R_i)}, y_{(2,R_i)}, y_{(3,R_i)}) := \left(g_{R_i}^{x(1,R_i)} h_{R_i}^{x(2,R_i)}, g_{R_i}^{x(3,R_i)} h_{R_i}^{x(4,R_i)}, g_{R_i}^{x(5,R_i)}\right)$$

as his public key.

Protocol 1 is extended by the following steps.

1:8. U computes $$P_U^{R_i} = g_{R_i}^{x_U} h_{R_i}^{s_U^{O_i}} \text{ if } i \neq 0$$

and $P_U^{R_o} = g_{R_o}^{x_U}$ otherwise. U sends $P_U^{R_4}$ to $O_i$.

1:9. U engages with $O_i$ in $$PK\{(\alpha, \beta): (P_U^{O_i})^2 = (a_{O_i}^2)^{\alpha}(b_{O_i}^2)^{\beta} \wedge P_U^{R_i} = g_{R_i}^{\alpha} h_{R_i}^{\beta}\}$$

if $i \neq 0$ and $$PK\{(\alpha, \beta): (P_U^{O_0})^2 = (a_{O_0}^2)^{\alpha}(b_{O_0}^2)^{\beta} \wedge P_U^{R_0} = g_{R_0}^{\alpha}\}$$

otherwise.

1:10. Both $O_i$ and U store $P_U^{R_i}$ with $P_U^{O_i}$.

Let $m_j$ be some agreed-upon text describing under which condition $R_j$ is allowed to revoke the anonymity of the transaction of which the current execution of Protocol 3 or 4 is part of, respectively. In the following we provide the steps to be executed after Protocol 3 or 4 in order to get local and/or global revocation.

Protocol 6 (Local Revocation)

6:1. U chooses $r_1 \in_R \mathbb{Z}_{qR_j}$, and computes $c_{(1,U)}^{R_j} := g_{R_j}^{r_1}$, $c_{(2,U)}^{R_j} := h_{R_j}^{r_1}$, $c_{(3,U)}^{R_j} := y_{(3,R_j)}^{r_1} P_U^{R_j}$, and $$c_{(4,U)}^{R_j} := y_{(1,R_j)}^{r_1} y_{(2,R_j)}^{r_1 H\left(c_{(1,U)}^{R_j}, c_{(2,U)}^{R_j}, c_{(3,U)}^{R_j}, m_j\right)}$$

and sends $(c_{(1,U)}^{R_j}, c_{(2,U)}^{R_j}, c_{(3,U)}^{R_j}, c_{(4,U)}^{R_j})$ to V.

6:2. U and V engage in $$PK\left\{(\alpha, \beta, \gamma, \delta, \varepsilon): d_{O_j}^2 = (A^2)^{\alpha}\left(1/(a_{O_j}^2)\right)^{\beta}\left(1/(b_{O_j}^2)\right)^{\gamma}\left(1/(h_{O_j}^2)\right)^{\delta} \wedge c_{(1,U)}^{R_j} = g_{R_j}^{\varepsilon} \wedge c_{(2,U)}^{R_1} = h_{R_j}^{\varepsilon} \wedge \right.$$
$$\left. c_{(3,U)}^{R_j} = g_{R_1}^{\beta} h_{R_1}^{\gamma} y_{(3,R_j)}^{\varepsilon} \wedge c_{(4,U)}^{R_j} = y_{(1,R_0)}^{\varepsilon} y_{(2,R_1)}^{H\left(c_{(1,U)}^{R_j},c_{(2,U)}^{R_j},c_{(3,U)}^{R_j},m_j\right)\varepsilon}\right\}$$

Protocol 7 (Global Revocation)

7:1. U chooses $r_2 \in_R \mathbb{Z}_{qR_0}$ and computes $$c_{(1,U)}^{R_0} := g_{R_0}^{r_2}, c_{(2,U)}^{R_0} := h_{R_0}^{r_2}, c_{(3,U)}^{R_0} := y_{(3,R_0)}^{r_2} P_U^{R_0}),$$

and $$c_{(4,U)}^{R_0} := y_{(1,R_0)}^{r_2} y_{(2,R_0)}^{r_2 H\left(c_{(1,U)}^{R_0}, c_{(2,U)}^{R_0}, c_{(3,U)}^{R_0}, m_0\right)}$$

and sends $(c_{(1,U)}^{R_0}, c_{(2,U)}^{R_0}, c_{(3,U)}^{R_0}, c_{(4,U)}^{R_0})$ to V.

7:2. U and V engage in $$PK\left\{(\alpha, \beta, \gamma, \delta, \varepsilon): d_{O_j}^2 = (A^2)^{\alpha}\left(1/(a_{O_j}^2)\right)^{\beta}\left(1/(b_{O_j}^2)\right)^{\gamma}\left(1/(h_{O_j}^2)\right)^{\delta} \wedge c_{(1,U)}^{R_0} = g_{R_0}^{\varepsilon} \wedge c_{(2,U)}^{R_0} = h_{R_0}^{\varepsilon} \wedge \right.$$
$$\left. c_{(3,U)}^{R_0} = g_{R_0}^{\beta} y_{(3,R_0)}^{\varepsilon} \wedge c_{(4,U)}^{R_0} = y_{(1,R_0)}^{\varepsilon} y_{(2,R_0)}^{H\left(c_{(1,U)}^{R_0},c_{(2,U)}^{R_0},c_{(3,U)}^{R_0},m_0\right)\varepsilon}\right\}$$

REFERENCES

Asokan, N., Shoup, V., and Waidner, M. (2000). Optimistic fair exchange of digital signatures. *IEEE Journal on Selected Areas in Communications*, 18(4):591-610.

Ateniese, G., Camenisch, J., Joye, M., and Tsudik, G. (2000). A practical and provably secure coalition-resistant group signature scheme. In Bellare, M., editor, *Advances in Cryptology—CRYPTO* 2000, volume 1880 of *Lecture Notes in Computer Science*, pages 255-270. Springer Verlag.

Barić, N. and Pfitzmann, B. (1997). Collision-free accumulators and fail-stop signature schemes without trees. In Fumy, W., editor, *Advances in Cryptology—EUROCRYPT '97*, volume 1233 of *Lecture Notes in Computer Science*, pages 480-494. Springer Verlag.

Bellare, M. and Rogaway, P. (1993). Random oracles are practical: A paradigm for designing efficient protocols. In *First ACM Conference on Computer and Communication Security*, pages 62-73. Association for Computing Machinery.

Boudot, F. (2000). Efficient proofs that a committed number lies in an interval. In Preneel, B., editor, *Advances in Cryptology—EUROCRYPT* 2000, volume 1807 of *Lecture Notes in Computer Science*, pages 431-444. Springer Verlag.

Brands, S. (1993). Electronic cash systems based on the representation problem in groups of prime order. In *Pre-proceedings of Advances in Cryptology—CRYPTO '93*, pages 26.1-26.15.

Brickell, E. F., Chaum, D., Damg ard, I. B., and van de Graaf, J. (1988). Gradual and verifiable release of a secret. In Pomerance, C., editor, *Advances in Cryptology—CRYPTO '87*, volume 293 of *Lecture Notes in Computer Science*, pages 156-166. Springer-Verlag.

Camenisch, J. and Damg ard, I. (1998). Verifiable encryption and applications to group signatures and signature sharing. Technical Report RS-98-32, BRICS, Department of Computer Science, University of Aarhus.

Camenisch, J. and Michels, M. (1998). A group signature scheme with improved efficiency. In Ohta, K. and Pei, D., editors, *Advances in Cryptology—ASIACRYPT '98*, volume 1514 of *Lecture Notes in Computer Science*, pages 160-174. Springer Verlag.

Camenisch, J. and Michels, M. (1999a). Proving in zero-knowledge that a number n is the product of two safe primes. In Stern, J., editor, *Advances in Cryptology—EURO-CRYPT '99*, volume 1592 of *Lecture Notes in Computer Science*, pages 107-122. Springer Verlag.

Camenisch, J. and Michels, M. (1999b). Separability and efficiency for generic group signature schemes. In Wiener, M., editor, *Advances in Cryptology—CRYPTO '99*, volume 1666 of *Lecture Notes in Computer Science*, pages 413-430. Springer Verlag. Camenisch, J. and Stadler, M. (1997). Efficient group signature schemes for large groups. In Kaliski, B., editor, *Advances in Cryptology—CRYPTO '97*, volume 1296 of Lecture Notes in *Computer Science*, pages 410-424. Springer Verlag.

Chaum, D. (1983). Blind signatures for untraceable payments. In Chaum, D., Rivest, R. L., and Sherman, A. T., editors, *Advances in Cryptology—Proceedings of CRYPTO '82*, pages 199-203. Plenum Press.

Chaum, D. (1991). Zero-knowledge undeniable signatures. In Damg ard, I. B., editor, *Advances in Cryptology—EUROCRYPT '90*, volume 473 of *Lecture Notes in Computer Science*, pages 458-464. Springer-Verlag.

Chaum, D., Evertse, J. -H., and van de Graaf, J. (1988). An improved protocol for demonstrating possession of discrete logarithms and some generalizations. In Chaum, D. and Price, W. L., editors, *Advances in Cryptology—EUROCRYPT '87*, volume 304 of Lecture Notes in *Computer Science*, pages 127-141. Springer-Verlag.

Chaum, D. and Pedersen, T. P. (1993). Wallet databases with observers. In Brickell, E. F., editor, *Advances in Cryptology—CRYPTO '92*, volume 740 of *Lecture Notes in Computer Science*, pages 89-105. Springer-Verlag.

Cramer, R. and Shoup, V. (1998). A practical public key cryptosystem provably secure against adaptive chosen ciphertext attack. In Krawczyk, H., editor, *Advances in Cryptology—CRYPTO '98*, volume 1642 of *Lecture Notes in Computer Science*, pages 13-25, Berlin. Springer Verlag.

Cramer, R. and Shoup, V. (1999). Signature schemes based on the strong rsa assumption. In *Proc. 6th ACM Conference on Computer and Communications Security*, pages 46-52. ACM press.

ElGamal, T. (1985). A public key cryptosystem and a signature scheme based on discrete log-arithms. In Blakley, G. R. and Chaum, D., editors, *Advances in Cryptology—CRYPTO '84*, volume 196 of *Lecture Notes in Computer Science*, pages 10-18. Springer Veriag.

Fiat, A. and Shamir, A. (1987). How to prove yourself: Practical solution to identification and signature problems. In Odlyzko, A. M., editor, *Advances in Cryptology—CRYPTO '86*, volume 263 of *Lecture Notes in Computer Science*, pages 186-194. Springer Verlag.

Fujisaki, E. and Okamoto, T. (1997). Statistical zero knowledge protocols to prove modular polynomial relations. In Kaliski, B., editor, *Advances in Cryptology—CRYPTO '97*, volume 1294 of *Lecture Notes in Computer Science*, pages 16-30. Springer Verlag.

Fujisaki, E. and Okamoto, T. (1998). A practical and provably secure scheme for publicly verifiable secret sharing and its applications. In Nyberg, K., editor, *Advances in Cryptology—EUROCRYPT '98*, volume 1403 of *Lecture Notes in Computer Science*, pages 32-46. Springer Verlag.

Gennaro, R., Halevi, S., and Rabin, T. (1999). Secure hash-and-sign signatures without the random oracle. In Stern, J., editor, *Advances in Cryptology—EUROCRYPT '99*, volume 1592 of *Lecture Notes in Computer Science*, pages 123-139. Springer Verlag.

Pointcheval, D. (1996). *Les Preuses de Connaissance et leurs Preuves de Sécurité*. PhD thesis, Université de Caen.

Schnorr, C. P. (1991). Efficient signature generation for smart cards. *Journal of Cryptology*, 4(3):239-252.

The invention claimed is:

1. A method for establishing a pseudonym system by having a certificate authority accepting a user as a new participant in said pseudonym system, the method comprising the steps of:

receiving a first public key provided by said user;

verifying that said user is allowed to join the system;

computing a credential by signing the first public key using a secret key owned by said certificate authority; and publishing said first public key and said credential, wherein the step of receiving a first public key further includes receiving an external public key being registered for said user with an external public key infrastructure and receiving an encryption of a secret key encrypted by using said first public key;

the step of verifying that said user is allowed to join the system further includes verifying that said external public key is indeed registered with said external public key infrastructure;

the step of publishing said first public key and said credential comprises publishing said encryption and the name of the external public key infrastructure; and additionally comprises the step of proving that the secret key corresponding to said external public key is encrypted in said received encryption.

2. The method according to claim 1, wherein said first public key of the user is derived from at least one first secret key composed by the user.

3. The method according to claim 2, wherein the step of receiving a first public key derived from a first secret key further comprises receiving a second public key which is derived from a second and a third secret key composed by the user; and the step of computing a credential by signing the first public key using a secret key owned by said certificate authority further comprises computing a credential by signing the second public key using said secret key owned by said certificate authority.

4. A computer program product stored on a computer usable medium, comprising computer readable program means for executing the method in claim 1 by a computer.

5. A method for establishing a pseudonym system by having an organization register a user, the method comprising the steps of:

receiving a first public key provided by said user;

receiving a first encryption encrypted by using said first public key;

proving that an existing public key is registered for said user with another organization of said pseudonym system and proving that the secret key corresponding to said existing public key is encrypted in said received first encryption;

publishing said first public key, said first encryption and the name of said other organization.

6. The method according to claim 5, wherein proving that an existing public key is registered for said user with said other organization of said pseudonym system and proving that the secret key corresponding to said existing public key is encrypted in said received first encryption includes proving possession of a credential issued by said organization of said existing public key.

7. The method according to claim 6, wherein
the step of receiving a first encryption encrypted by using said first public key further comprises receiving a second encryption encrypted by using said existing public key;
the step of proving that the secret key corresponding to said existing public key is encrypted in said received first encryption further comprises proving that the secret key corresponding to said first public key is encrypted in said received second encryption; and
the step of publishing said first public key, said first encryption, and the name of said other organization further comprises publishing said second encryption.

8. The method according to claim 7, wherein
the step of receiving a first encryption encrypted by using said first public key further comprises receiving a third encryption encrypted by using a public key published by a revocation manager; and
the step of proving that the secret key corresponding to said existing public key is encrypted in said received first encryption further comprises proving that said existing public key is encrypted in said received third encryption.

9. The method according to claim 8, wherein
the first public key of the user is derived from at least two secret keys composed by the user.

10. The method according to claim 9, wherein
the step of proving that the secret key corresponding to said first public key is encrypted in said received second encryption includes proving that all of said at least two secret keys corresponding to said first public key are encrypted in said second encryption.

11. The method according to claim 10, further comprising a step of
proving that the first public key is derived from at least two secret keys and proving that one of the secret keys is identical to one of the secret keys used to derive another public key from which the user claims it is registered with another organization.

12. The method according to claim 11, wherein
the existing public key of the user is derived from at least two secret keys composed by the user.

13. The method according to claim 12, wherein
the step of proving that the secret key corresponding to said existing public key is encrypted in said received first encryption includes proving that all of said at least two secret keys corresponding to said existing public key are encrypted in said first encryption.

14. The method according to claim 13, further comprising the steps of
receiving a third public key provided by said user;
proving that one secret key used to derive said third public key is identical to one secret key used to derive said existing public key from which the user claims it is registered with a specified organization.

15. The method according to claim 14, further comprising the step of:
computing a credential by signing the first public key using a secret key owned by said organization;
and wherein the step of publishing said first public key, said first encryption and the name of said other organization further comprises publishing said certificate.

16. The method according to claim 15, wherein
the step of receiving a first public key derived from a first secret key further comprises receiving a second public key which is derived from a second and a third secret key composed by the user; and
the step of computing a credential by signing the first public key using a secret key owned by said certificate authority further comprises computing a credential by signing the first and second public key using said secret key owned by said certificate authority.

17. The method according to claim 5, further comprising the steps of:
receiving a request from an organization for revealing a pseudonym or the identity of the user;
judging whether it is justified to reveal the pseudonym or the identity of the user; and
sending the pseudonym or the identity of the user to the requesting organization, in case that this is justified.

18. A method for having a verifier checking possession of a credential by a user issued by a specified organization, the method comprising the steps of:
proving that an existing public key is registered for said user with said specified organization of said pseudonym system,
receiving a third encryption encrypted by using a public key published by a revocation manager; and
proving that said existing public key is encrypted in said received third encryption,
wherein the step of proving that an existing public key is registered for said user with said specified organization of said pseudonym system includes proving possession of a credential issued by said organization of said existing public key.

19. The method according to claim 18, further comprising the steps of:
receiving a third public key provided by said user;
proving that one secret key used to derive said third public key is identical to one secret key used to derive said existing public key from which the user claims it is registered with said specified organization.

* * * * *

UNITED STATES PATENT AND TRADEMARK OFFICE
CERTIFICATE OF CORRECTION

PATENT NO. : 7,360,080 B2
APPLICATION NO. : 10/000918
DATED : April 15, 2008
INVENTOR(S) : Camnisch et al.

It is certified that error appears in the above-identified patent and that said Letters Patent is hereby corrected as shown below:

Column 4, line 19, replace "Spins" with --Splns--
Column 4, line 46, replace "Spins" with --Splns--

Column 5, line 3, replace " $|w| \leq p(|x|)$ "

with -- $|w| \leq p(|x|)$ --

Column 6, line 43, replace " $P_U^{CA} - f_{CA}(S_U^{CA})$ "

with -- $P_U^{CA} = f_{CA}(S_U^{CA})$ --

Column 7, line 5, replace " $e_1^{(O_i, O_j)} - Enc_{P_U}\sigma_i$ "

with -- $e_1^{(O_i, O_j)} = Enc_{P_U^{O_i}}$ --

Column 7, line 6 replace " $e_1^{(O_i, O_j)}$ to $O$ "

with -- $e_1^{(O_i, O_j)}$ to $O_i$ --

Column 7, lines 12-13, replace " $PK\{(\alpha, \beta, \gamma, \delta): \alpha = f_{O_j}(\beta) \wedge e_1^{(O_i,O_j)} = Enc_{P_U}{}^{p_i}(\beta, \gamma) \wedge 1 = Ver(\alpha, \delta, P_{O_j})\}$ "

with -- $PK\{(\alpha, \beta, \gamma, \delta) : \alpha = f_{O_j}(\beta) \wedge e_1^{(O_i, O_j)} = Enc_{P_U^{O_i}}(\beta, \gamma) \wedge 1 = Ver(\alpha, \delta, P_{O_j})\}$ --

Column 7, line 16, replace " $c_U^{O_i} - Sig(P_U^{O_i}, S_{O_i})$ "

with -- $c_U^{O_i} = Sig(P_U^{O_i}, S_{O_i})$ --

Column 7, line 17, replace " $(P_U^{O_i}, c^{UO_i}, e_1^{(O_i, O_j)}, O_j)$ "

with -- $(P_U^{O_i}, c_U^{O_i}, e_1^{(O_i, O_j)}, O_j)$ --

Column 8, lines 16-17, replace " $PK\{(\alpha, \beta, \gamma, \delta, \epsilon, \nu): \alpha = f_{O_j}(\beta) \wedge e_1^{O_i, O_j} = Enc_{P_U^{O_i}}(\beta, \gamma) \wedge P_U^{O_i} = f_{O_j}(\epsilon) \wedge e_2^{(O_i, O_j)} = Enc_\alpha(\epsilon, \nu)\}$ "

with --
$PK\{(\alpha, \beta, \gamma, \delta, \epsilon, \nu) : \alpha = f_{O_j}(\beta) \wedge e_1^{(O_i,O_j)} = Enc_{P_U^{O_i}}(\beta, \gamma) \wedge 1 = Ver(\alpha, \delta, P_{O_j}) \wedge$
$P_U^{O_i} = f_{O_j}(\epsilon) \wedge e_2^{(O_i, O_j)} = Enc_\alpha(\epsilon, \nu)\}$ --

UNITED STATES PATENT AND TRADEMARK OFFICE
CERTIFICATE OF CORRECTION

PATENT NO. : 7,360,080 B2
APPLICATION NO. : 10/000918
DATED : April 15, 2008
INVENTOR(S) : Camnisch et al.

It is certified that error appears in the above-identified patent and that said Letters Patent is hereby corrected as shown below:

Column 9, lines 21-22, replace " encryptions $e_1^{(O_i, O_j)} = Enc_{P_U^{O_j}}(S_U^{O_j}, r_1)$, and $v^{(O_i, R_j)} = Enc_{P_{R_j}}(P_U^{O_j} || m_R, r_3)$ and sends $e_1^{(O_i, O_j)}$ and $v^{(O_i, R_j)}$ to $O_i$. "

with -- and $v^{(O_i, R_j)} = Enc_{P_{R_j}}(P_U^{O_j} || m_R, r_3)$ and sends $e_1^{(O_i, O_j)}$ and $v^{(O_i, R_j)}$ to $O_i$.
encryptions $e_1^{(O_i, O_j)} = Enc_{P_U^{O_i}}(S_U^{O_j}, r_1)$. --

Column 9, lines 32-33, replace " $PK\{(\alpha, \beta, \gamma, \delta, \epsilon, \nu): \alpha = f_{O_j}(\beta) \wedge e_1^{(O_i, O_j)} = Enc_{P_U^{O_i}}(\beta, \gamma) \wedge 1 = Ver(\alpha, \delta, P_{O_j}) \wedge v^{(O_i, R_j)} = Enc_{P_{R_j}}(\alpha || m_R, \nu)\}$ "

with -- $PK\{(\alpha, \beta, \gamma, \delta, \epsilon, \nu): \alpha = f_{O_j}(\beta) \wedge e_1^{(O_i, O_j)} = Enc_{P_U^{O_i}}(\beta, \gamma) \wedge 1 = Ver(\alpha, \delta, P_{O_j}) \wedge$
$v^{(O_i, R_j)} = Enc_{P_{R_j}}(\alpha || m_R, \nu)\}$ --

Column 9, line 42, replace " $v^{(V, R_i)} = Enc_{P_{R_i}}(P_U^{O_i} || m_R, r_3)$ and sends $v^{(V, R_i)}$ to V. "

with -- $v^{(V, R_i)} = Enc_{P_{R_i}}(P_U^{O_i} || m_R, r_3)$ and sends $v^{(V, R_i)}$ to $V$. --

Column 9, lines 48-49, replace " $PK\{(\alpha, \beta, \delta, \gamma): \alpha = f_{O_j}(\beta) \wedge 1 = Ver(\alpha, \delta, P_{O_j}) \wedge v^{(O_i, R_j)} = Enc_{P_{R_j}}(\alpha || m_R, \gamma)\}$ "

with -- $PK\{(\alpha, \beta, \delta, \gamma): \alpha = f_{O_j}(\beta) \wedge 1 = Ver(\alpha, \delta, P_{O_j}) \wedge$
$v^{(O_i, R_j)} = Enc_{P_{R_j}}(\alpha || m_R, \gamma)\}$ --

Column 10, lines 37-39, replace " 2a'''. U chooses a random $r$, computes $e_1^{(O_i, O_j)} = Enc_{P_U^{O_j}}(S_U^{O_j}, r)$ and $\hat{P}_U^{O_j} = \hat{f}_{O_j}(S_U^{O_j})$, and sends $e_1^{O_j}$ and $\hat{P}_U^{O_j}$ to $O_i$. "

with -- 2a'''. U chooses a random $r$, computes $e_1^{(O_i, O_j)} = Enc_{P_U^{O_i}}(S_U^{O_j}, r)$ and $\hat{P}_U^{O_j} = \hat{f}_{O_j}(S_U^{O_j})$, and sends $e_1^{O_j}$ and $\hat{P}_U^{O_j}$ to $O_i$. --

Column 11, line 54, replace " $(P_U^{CA}, \hat{P}_U^{CA})$ "

with -- $(P_U^X, \widetilde{P}_U^X)$ --

UNITED STATES PATENT AND TRADEMARK OFFICE
CERTIFICATE OF CORRECTION

PATENT NO. : 7,360,080 B2  Page 3 of 7
APPLICATION NO. : 10/000918
DATED : April 15, 2008
INVENTOR(S) : Camnisch et al.

It is certified that error appears in the above-identified patent and that said Letters Patent is hereby corrected as shown below:

Column 12, line 2, replace " $P_U^{O_i} = f_{O_i}(S_U^{O_i})$ "

with -- $P_U^{O_i} = f_{O_i}(S_U^{O_i})$ --

Column 12, lines 25-26, replace " $PK\{(\alpha,\beta,\gamma,\delta,\epsilon,\xi,\Phi): \alpha = f_{O_i}(\beta) \land \gamma = f_{O_i}(\delta,\epsilon) \land e_1^{(O_i,O_j)} = Enc_{P_U^{O_i}}(\beta\|\delta\|\epsilon,\xi) \land 1 = Ver(\alpha\|\gamma,\Phi,P_{O_j}) \land \widehat{P'}_U^{O_j} = f_{O_j}(\delta) \land \widehat{P''}_U^{O_j} = f_{O_j}(\epsilon)\}$ "

with -- $PK\{(\alpha,\beta,\gamma,\delta,\epsilon,\xi,\varphi)\alpha = f_{O_j}(\beta) \land \gamma = \tilde{f}_{O_j}(\delta,\epsilon) \land e_1^{(O_i,O_j)} = Enc_{P_U^{O_i}}(\beta\|\delta\|\epsilon,\xi) \land 1 = Ver(\alpha\|\gamma,\varphi,P_{O_j}) \land \widehat{P'}_U^{O_j} = f_{O_j}(\delta) \land \widehat{P''}_U^{O_j} = f_{O_j}(\epsilon)\}$ --

Column 12, line 59-60, replace " $PK\{(\alpha,\beta,\gamma,\delta,\epsilon,\xi,\Phi): \alpha = f_{O_j}(\beta) \land \gamma = f_{O_j}(\delta,\epsilon) \land 1 = Ver(\alpha\|\gamma,\Phi,P_{O_j}) \land \widehat{P'}_U^{O_j} = f_{O_j}(\delta) \land \widehat{P''}_U^{O_j} = f_{O_j}(\epsilon) \land\}$ "

with -- $PK\{(\alpha,\beta,\gamma,\delta,\epsilon,\xi,\varphi): \alpha = f_{O_j}(\beta) \land \gamma = \tilde{f}_{O_j}(\delta,\epsilon) \land 1 = Ver(\alpha\|\gamma,\varphi,P_{O_j}) \land \widehat{P'}_U^{O_j} = f_{O_j}(\delta) \land \widehat{P''}_U^{O_j} = f_{O_j}(\epsilon) \land \}$ --

Column 13, line 42, replace "$s_i^- s_k$"

with --$s_i = s_k$--

Column 14, line 44, replace " $c = Dec_{D_{V_i}}(Enc_{E_{V_i}}(a, r_1) \star Enc_{E_{V_i}}$ "

with -- $c = Dec_{D_{V_i}}(Enc_{E_{V_i}}(a, r_1) \star Enc_{E_{V_i}}$ --

Column 14, line 59, replace " $z_U^{(CA,V_k)} = Enc_{E_V}'(\check{S}, r),$ "

with -- $z_U^{(CA,V_k)} = Enc_{E_{V_k}}(\check{S}, r),$ --

Column 15, lines 15 and 16, replace " (b) $O_i$ chooses a random $\check{S}$ and an $r$, computes $\check{P}_U^{O_i} = \check{P} \star f_{O_i}(0, \check{S})$ and $z_U^{(O_i,V_k)} = Enc_{E_V}'(\check{S}, r)$, sends $P_U^{O_i}$ "

with -- (b) $O_i$ chooses a random $\check{S}$ and an $r$, computes $\check{P}_U^{O_i} = \check{P} \star f_{O_i}(0, \check{S})$ and $z_U^{(O_i,V_k)} = Enc_{E_{V_k}}(\check{S}, r)$, sends $P_U^{O_i}$ --

UNITED STATES PATENT AND TRADEMARK OFFICE
CERTIFICATE OF CORRECTION

PATENT NO.       : 7,360,080 B2
APPLICATION NO. : 10/000918
DATED            : April 15, 2008
INVENTOR(S)      : Camnisch et al.

It is certified that error appears in the above-identified patent and that said Letters Patent is hereby corrected as shown below:

Column 15, line 30, replace " $\check{z}_U^{(O_j,O_j)} \star Enc_{E_O}'(S', \ r_1S = \check{S}_U^{O_j} \ominus S',$ "

with -- $\check{z}_U^{(O_j,O_i)} \star Enc_{E_{O_i}}(S', r_1)$ and $S = \check{S}_U^{O_j} \ominus S'$. --

Column 15, lines 40-41, replace " $\widetilde{PK}\{(\alpha,\beta,\gamma,\delta,\epsilon) : \alpha = f_{O_j}(\beta,\gamma) \wedge e_1^{(O_i,O_j)} = Enc_{P_U}O_i(\beta,\delta) \wedge 1 = Ver(\alpha,\epsilon,P_{O_j})\}$ "

with -- $\widetilde{PK}\{(\alpha,\beta,\gamma,\delta,\epsilon) : \alpha = \check{f}_{O_j}(\beta,\gamma) \wedge e_1^{(O_i,O_j)} = Enc_{P_U^{O_i}}(\beta,\delta) \wedge 1 = Ver(\alpha,\epsilon,P_{O_j})\}$ --

Column 15, line 52, replace " $\check{f}_{O_i}(\beta,\gamma) \wedge e_1^{(O_i,O_j)} = Enc_{P_U}O_i$ "

with -- $\check{f}_{O_j}(\beta,\gamma) \wedge e_1^{(O_i,O_j)} = Enc_{P_U^{O_i}}$ --

Column 15, line 58, replace " $\check{f}_{O_j}(S_{O_j}, s_i \oplus S)$, where $S$ and $S_{O_j}$ "

with -- $\check{f}_{O_j}(S_U^{O_j}, s_i \oplus S)$, where $S$ and $S_U^{O_j}$ --

Column 15, line 63, replace " $\alpha = \check{f}_{O_j}(\beta,\gamma) \wedge e_1^{(O_i,O_j)} = Enc_{P_U}O_i$ "

with -- $\alpha = \check{f}_{O_j}(\beta,\gamma) \wedge e_1^{(O_i,O_j)} = Enc_{P_U^{O_i}}$ --

Column 16, lines 57-58, replace " $PK\{(\alpha,\beta,\gamma,\delta,\epsilon,\xi):\alpha = f_{O_j}(\epsilon,\beta) \wedge e_1^{(O_i,O_j)} = Enc_{P_U}O_i(\beta,\gamma) \wedge 1 = Ver(\alpha,\delta,P_{O_j}) \wedge P_U^{O_i} = f_{O_i}(\epsilon,\xi)\}$ "

with -- $PK\{(\alpha,\beta,\gamma,\delta,\epsilon,\xi): \alpha = f_{O_j}(\epsilon,\beta) \wedge e_1^{(O_i,O_j)} = Enc_{P_U^{O_i}}(\beta,\gamma) \wedge 1 = Ver(\alpha,\delta,P_{O_j}) \wedge P_U^{O_i} = f_{O_i}(\epsilon,\xi)\}$ --

Column 17, line 25, replace " $1 - Ver(\alpha || attr, \delta P_O)$. "

with -- $1 = Ver(\alpha || attr, \delta, P_{O_j})$. --

Column 17, line 61, replace " Let n=pq "

with -- $n = pq$ --

UNITED STATES PATENT AND TRADEMARK OFFICE
CERTIFICATE OF CORRECTION

PATENT NO. : 7,360,080 B2
APPLICATION NO. : 10/000918
DATED : April 15, 2008
INVENTOR(S) : Camnisch et al.

It is certified that error appears in the above-identified patent and that said Letters Patent is hereby corrected as shown below:

Column 19, line 18-19, replace " $PK\{(\alpha_1, \ldots, \alpha_i) : y = z_1^{\alpha_1}, \ldots, z_v^{\alpha_v}\}.$ "

with -- $PK\{(\alpha_1, \ldots, \alpha_v) : y = z_1^{\alpha_1} \cdot \ldots \cdot z_v^{\alpha_v}\}.$ --

Column 20, line 51, replace "G=:ε, D)"

with -- $\mathcal{G} = (\mathcal{E}, \mathcal{D})$ --

Column 20, lines 56-59, replace " $Pr[A_k(C, E_1, \ldots, E_n)=0|(E_1, D_1)\in_R \mathcal{G}, \ldots, (E_n, D_n)\in_R \mathcal{G}; C=(E_{i_1}(0), \ldots, E_{i_n}(0))] - Pr[A_k(C, E_1, \ldots, E_n)=0|(E_1, D_1)\in_R \mathcal{G}, \ldots, (E_n, D_n)\in_R \mathcal{G}; C=(E_{i_1}(D_{j_1}), \ldots, E_{i_n}(D_{j_n}))]| = neg(k)$ "

with --
$|Pr[A_k(C, E_1, \ldots, E_n) = 0|(E_1, D_1) \in_R \mathcal{G}, \ldots, (E_n, D_n) \in_R \mathcal{G}; C = (E_{i_1}(0), \ldots, E_{i_n}(0))] - Pr[A_k(C, E_1, \ldots, E_n) = 0|(E_1, D_1) \in_R \mathcal{G}, \ldots, (E_n, D_n) \in_R \mathcal{G}; C = (E_{i_1}(D_{j_1}), \ldots, E_{i_n}(D_{j_n}))]| = neg(k)$ --

Column 20, line 64, replace "Let H: $\{0, 1\}^* \to \{0, 1\}_k$"

with -- $H : \{0, 1\}^* \to \{0, 1\}^k$ --

Column 21, line 7, replace "P=$a^x b^y$"

with -- $P = a^x b^y$ --

Column 21, line 12, replace "G=(a)=(b) be~$2^l$."

with -- $G = \langle a \rangle = \langle b \rangle$ be $\approx 2^\ell$. --

Column 21, line 45, replace "G=(a)=(b),"

with -- $G = \langle a \rangle = \langle b \rangle$. --

Column 22, lines 51-53, replace " $\Gamma=]-2^{\ell_r}, 2^{\ell_r}[, \Delta=]-2^{\ell_\Delta}, 2^{\ell_\Delta}[, \Lambda=]2^{\ell_\Lambda}, 2^{\ell_\Lambda+\ell_\Sigma}[$ such that $l_\Delta=\Delta l_\Gamma$ and $l_\Gamma=2l_n$, where $\Delta>1$ is a security parameter, and $2^{\ell_\Lambda}>2(2^{2\ell_r}+2^{\ell_r}+2^{\ell_\Delta})$, and $2(2^{\ell_\Sigma}(2^{2\ell_r}+2^{\ell_\Delta})+2^{\ell_\Delta})<2^{\ell_\Lambda}$. "

with -- $\Gamma=]-2^{\ell_r}, 2^{\ell_r}[, \Delta = ]-2^{\ell_\Delta}, 2^{\ell_\Delta}[, \Lambda = ]2^{\ell_\Lambda}, 2^{\ell_\Lambda+\ell_\Sigma}[$ such that $\ell_\Delta = \epsilon\ell_\Gamma$ and $\ell_\Gamma = 2\ell_n$, where $\epsilon > 1$ is a security parameter, and $2^{\ell_\Lambda} > 2(2^{2\ell_r} + 2^{\ell_r} + 2^{\ell_\Delta})$, and $2(2^{\ell_\Sigma}(2^{2\ell_r} + 2^{\ell_\Delta}) + 2^{\ell_\Delta}) < 2^{\ell_\Lambda}$. --

UNITED STATES PATENT AND TRADEMARK OFFICE
CERTIFICATE OF CORRECTION

PATENT NO. : 7,360,080 B2  
APPLICATION NO. : 10/000918  
DATED : April 15, 2008  
INVENTOR(S) : Camnisch et al.

It is certified that error appears in the above-identified patent and that said Letters Patent is hereby corrected as shown below:

Column 22, line 57, replace " $a_{O_i};\ b_{O_i};\ d_{O_i};\ g_{O_i},\ h_{O_i},\ \epsilon QR_{n_0}'.$ "

with -- $a_{O_i};\ b_{O_i},\ d_{O_i};\ g_{O_i},\ h_{O_i},\ \epsilon QR_{n_0}'.$ --

Column 22, line 62, replace " $QR_{n_0}'.$ "

with -- $QR_{n_{O_i}}$ --

Column 23, lines 44-47, replace " [formula] "

with -- $PK\{(\alpha,\beta,\gamma,\delta,\varepsilon,\zeta,\vartheta,\xi) : C_1^2 = (g_{O_i}^2)^\alpha (h_{O_i}^2)^\beta \wedge C_2^2 = (g_{O_i}^2)^\gamma (h_{O_i}^2)^\delta \wedge$ $C_3^2 = (g_{O_i}^2)^\varepsilon (h_{O_i}^2)^\zeta \wedge (P_U^{O_i})^2 = (a_{O_i}^2)^\gamma (b_{O_i}^2)^\vartheta \wedge$ $(C_1^2 (g_{O_i}^2)^{(r-2^{\ell_\Delta}+1)})/(C_3^2)^{(2^{\ell_\Delta+1}+1)} = (g_{O_i}^2)^\vartheta (h_{O_i}^2)^\xi \wedge \gamma \in \Gamma \wedge \vartheta \in \Delta_j$ --

Column 24, lines 64-68, replace " [formula] "

with -- $PK\{(\alpha,\beta,\gamma,\delta,\varepsilon,\zeta,\xi,\eta,\varphi) : d_{O_j}^2 = (A^2)^\alpha (1/(a_{O_j}^2))^\beta (1/(b_{O_j}^2))^\gamma (1/(h_{O_j}^2))^\delta \wedge$ $B^2 = (h_{O_j}^2)^\varepsilon (g_{O_j}^2)^\zeta \wedge 1 = (B^2)^\alpha (1/(h_{O_j}^2))^\delta (1/(g_{O_j}^2))^\xi \wedge (P_U^{O_i})^2 = (a_{O_i}^2)^\beta (b_{O_i}^2)^\eta \wedge$ $C^2 = (a_{O_i}^2)^\beta (b_{O_j}^2)^\gamma (h_{O_j}^2)^\varphi \wedge \beta \in \Gamma \wedge \gamma \in \Delta \wedge \alpha \in \Lambda\}$ . --

Column 25, line 67, replace " $z_{O_i} \epsilon QR_{n_0}'.$ "

with -- $z_{O_i} \in QR_{n_{O_i}}.$ --

UNITED STATES PATENT AND TRADEMARK OFFICE
CERTIFICATE OF CORRECTION

PATENT NO.       : 7,360,080 B2
APPLICATION NO.  : 10/000918
DATED            : April 15, 2008
INVENTOR(S)      : Camnisch et al.

It is certified that error appears in the above-identified patent and that said Letters Patent is hereby corrected as shown below:

Column 27, lines 17-25, replace "and $P_U^{R_i} = g_{R_i}^{xU}$ otherwise. U sends $P_U^{R_i}$ to $O_i$. 1:9. U engages with $O_i$ in $PK\{(\alpha, \beta): (P_U^{O_i})^2 = (a_{O_i}^2)^\alpha (b_{O_i}^2)^\beta \wedge P_U^{R_i} = g_{R_i}^\alpha h_{R_i}^\beta\}$ if $i \neq 0$ and $PK\{(\alpha, \beta): (P_U^{O_0})^2 = (a_{O_0}^2)^\alpha (b_{O_0}^2)^\beta \wedge P_U^{R_0} = g_{R_0}^\alpha\}$"

with "and $P_U^{R_0} = g_{R_0}^{xU}$ otherwise. $U$ sends $P_U^{R_i}$ to $O_i$. 1:9. $U$ engages with $O_i$ in $PK\{(\alpha, \beta) : (P_U^{O_i})^2 = (a_{O_i}^2)^\alpha (b_{O_i}^2)^\beta \wedge P_U^{R_i} = g_{R_i}^\alpha h_{R_i}^\beta\}$ if $i \neq 0$ and $PK\{(\alpha, \beta) : (P_U^{O_0})^2 = (a_{O_0}^2)^\alpha (b_{O_0}^2)^\beta \wedge P_U^{R_0} = g_{R_0}^\alpha\}$"

Column 27, lines 36-45, replace "6:1. U chooses $r_1 \in_R Z_{qR_j}$ and computes $c_{(1,U)}^{R_j} := g_{R_j}^{r_1}$, $C_{(2,U)}^{R_j} := h_{R_j}^{r_1}$, $c_{(3,U)}^{R_j} := y_{(3,R_j)}^{r_1} P_U^{R_j}$, and $c_{(4,U)}^{R_j} := y_{(1,R_j)}^{r_1 \mathcal{H}(c_{(1,U)}^{R_j}, c_{(2,U)}^{R_j}, c_{(3,U)}^{R_j}, m_j)} y_{(2,R_j)}^{r_1}$ and sends $(c_{(1,U)}^{R_j}, c_{(2,U)}^{R_j}, c_{(3,U)}^{R_j}, c_{(4,U)}^{R_j})$ to V."

with "6:1. $U$ chooses $r_1 \in_R \mathbb{Z}_{q_{R_j}}$ and computes $c_{(1,U)}^{R_j} := g_{R_j}^{r_1}$, $c_{(2,U)}^{R_j} := h_{R_j}^{r_1}$, $c_{(3,U)}^{R_j} := y_{(3,R_j)}^{r_1} P_U^{R_j}$, and $c_{(4,U)}^{R_j} := y_{(1,R_j)}^{r_1 \mathcal{H}(c_{(1,U)}^{R_j}, c_{(2,U)}^{R_j}, c_{(3,U)}^{R_j}, m_j)} y_{(2,R_j)}^{r_1}$ and sends $(c_{(1,U)}^{R_j}, c_{(2,U)}^{R_j}, c_{(3,U)}^{R_j}, c_{(4,U)}^{R_j})$ to V."

Signed and Sealed this

Thirtieth Day of September, 2008

JON W. DUDAS
*Director of the United States Patent and Trademark Office*